US010582092B2

(12) United States Patent
Ishido et al.

(10) Patent No.: US 10,582,092 B2
(45) Date of Patent: Mar. 3, 2020

(54) IMAGE READING APPARATUS WITH CORRECTION FOR SUB-SCANNING COLOR SHIFTS, IMAGE FORMING APPARATUS, IMAGE READING METHOD, AND COMPUTER READABLE NON-TRANSITORY STORAGE MEDIUM

(71) Applicant: CANON KABUSHIKI KAISHA, Tokyo (JP)

(72) Inventors: Katsuhiro Ishido, Abiko (JP); Daisuke Akagi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/591,789

(22) Filed: May 10, 2017

(65) Prior Publication Data
US 2017/0331983 A1    Nov. 16, 2017

(30) Foreign Application Priority Data

May 16, 2016    (JP) .................................. 2016-097857

(51) Int. Cl.
*H04N 1/00* (2006.01)
*H04N 1/58* (2006.01)
(Continued)

(52) U.S. Cl.
CPC ......... *H04N 1/6077* (2013.01); *H04N 1/0464* (2013.01); *H04N 1/0473* (2013.01);
(Continued)

(58) Field of Classification Search
USPC ............... 347/129–135, 177–188, 231–261; 355/35–41, 52–67; 358/1.9–3.29,
(Continued)

(56) References Cited

U.S. PATENT DOCUMENTS 4,994,907 A    2/1991  Allen ............................. 358/41
5,703,641 A *  12/1997  Watanabe ......... H01L 31/02162
                                                  348/274
(Continued)

FOREIGN PATENT DOCUMENTS

CN    1580974    2/2005
CN    1601323    3/2005
(Continued)

OTHER PUBLICATIONS

Extended European Search Report dated Oct. 9, 2017, in counterpart European Application No. 17170983.5.
(Continued)

*Primary Examiner* — Marcellus J Augustin
(74) *Attorney, Agent, or Firm* — Venable LLP

(57) ABSTRACT

An image reading apparatus includes a front-side reader, which includes a white LED configured to irradiate an original with light and a CMOS sensor configured to receive light that is reflected by the original. The front-side reader is configured to generate read data that represents a luminance value of an image on the original from the result of receiving light with the CMOS sensor. The image reading apparatus stores, in a non-volatile memory, a condition for determining whether there is a sub-scanning color shift, and uses a sub-scanning color shift detector to determine whether there is a sub-scanning color shift based on the read data obtained from the front-side reader and the condition stored in the non-volatile memory. When there is a sub-scanning color shift, the image reading apparatus corrects the sub-scanning color shift by correcting the read data with a color shift corrector.

21 Claims, 19 Drawing Sheets

(51) Int. Cl.
*H04N 5/372* (2011.01)
*H01J 37/153* (2006.01)
*H04N 1/60* (2006.01)
*H04N 1/04* (2006.01)
*H04N 1/047* (2006.01)
*H04N 1/401* (2006.01)
*H04N 1/48* (2006.01)

(52) U.S. Cl.
CPC ............ *H04N 1/401* (2013.01); *H04N 1/486* (2013.01); *H04N 1/6005* (2013.01); *H04N 2201/0094* (2013.01)

(58) Field of Classification Search
USPC ................ 358/1.11–1.18, 504–537, 448–485
See application file for complete search history.

(56) References Cited

U.S. PATENT DOCUMENTS

| | | | | |
|---|---|---|---|---|
| 7,733,548 | B2* | 6/2010 | Makino | H04N 1/387 355/82 |
| 7,782,503 | B2 | 8/2010 | Ishido et al. | 358/498 |
| 8,705,153 | B2 | 4/2014 | Ishido | 358/509 |
| 9,277,063 | B2 | 3/2016 | Kido | H04N 1/00013 |
| 10,171,708 | B2 | 1/2019 | Akagi et al. | H04N 1/62 |
| 2005/0036799 | A1 | 2/2005 | Tomita et al. | 399/49 |
| 2005/0063025 | A1 | 3/2005 | Hayashide | 358/497 |
| 2009/0251556 | A1 | 10/2009 | Mabuchi | 348/222.1 |
| 2011/0216380 | A1* | 9/2011 | Sato | H04N 1/04 358/505 |
| 2011/0242628 | A1 | 10/2011 | Morikawa et al. | 358/504 |
| 2012/0026359 | A1* | 2/2012 | Fukushima | H04N 5/2354 348/226.1 |
| 2012/0320437 | A1* | 12/2012 | Kanaya | H04N 1/401 358/518 |
| 2014/0233071 | A1* | 8/2014 | Kido | H04N 1/00013 358/3.26 |
| 2016/0234403 | A1* | 8/2016 | Watanabe | H04N 1/6033 |

FOREIGN PATENT DOCUMENTS

| | | |
|---|---|---|
| JP | H04-280575 | 10/1992 |
| JP | H08-116402 | 5/1996 |
| JP | H08-201616 | 8/1996 |
| JP | H10-42097 | 2/1998 |
| JP | H11-112749 | 4/1999 |
| JP | 2002-223369 | 8/2002 |
| JP | 2003-230016 | 8/2003 |
| JP | 2004-328200 | 11/2004 |
| JP | 2009-273119 | 11/2009 |
| JP | 2012-084649 | 4/2012 |
| JP | 2014-165538 | 9/2014 |

OTHER PUBLICATIONS

U.S. Appl. No. 15/589,327, filed May 8, 2017.
CN Office Action dated Apr. 3, 2019 in counterpart Chinese Patent Application No. 201710342857.5 with English translation.
U.S. Appl. No. 16/201,845, filed Nov. 27, 2018.
KR Office Action dated Aug. 31, 2019 in counterpart KR Application No. 10-2017-0059747 with English translation.
JP Office Action dated Jan. 21, 2020 in counterpart Japanese Application No. 2016-097857 with English translation.

* cited by examiner

READ IMAGE
PRIOR TO CORRECTION
(M+1)-TH LINE

THREE-PIXEL
CYCLE FLUCTUATION

R-READ DATA OF
(M+1)-TH LINE

G-READ DATA OF
(M+1)-TH LINE

B-READ DATA OF
(M+1)-TH LINE

CORRECTED READ IMAGE
(M+1)-TH LINE

IMAGE READING APPARATUS WITH CORRECTION FOR SUB-SCANNING COLOR SHIFTS, IMAGE FORMING APPARATUS, IMAGE READING METHOD, AND COMPUTER READABLE NON-TRANSITORY STORAGE MEDIUM

BACKGROUND OF THE INVENTION

Field of the Invention

The present invention relates to an image reading apparatus configured to read an image, for example, a scanner.

Description of the Related Art

Copying machines and multi-function printers include an image reading apparatus configured to read an image from an original. Well-known methods of reading using an image reading apparatus include a platen reading method in which an image is read by moving a reading unit over an original put on a platen and a flow reading method in which an image is read from an original that is being conveyed by an automatic document feeder mechanism. The reading unit includes a light emitter configured to irradiate an original and a light receiver configured to receive light that is reflected by the original. The image reading apparatus is configured to generate image data that represents the image on the original, based on the reflected light received by the light receiver.

A light emitting diode (LED) or a similar white light source is used as the light emitter. The light receiver includes as a light receiving element a photoelectric conversion element, for example. The photoelectric conversion element is built by, for example, forming an R (red) color filter, a G (green) color filter, and a B (blue) color filter through application on a light receiving surface in order to read color images. A charge-coupled device (CCD) sensor or a complementary metal oxide semiconductor (CMOS) sensor is used for the photoelectric conversion element. The reading unit is configured to read an original by receiving, with the light receiver, diffused light of light that is emitted from the light emitter and irradiates the original. The image reading apparatus is configured to generate image data from luminance data that is obtained as a result of receiving light with the light receiver of the reading unit (hereinafter referred to as "read data").

The following description takes as an example an image reading apparatus with a reading unit that uses a white LED for a light emitter and a CMOS sensor for a light receiver. The reading unit of this image reading apparatus is a linear sensor, and aligns a plurality of white LEDs and a plurality of CMOS sensors in a main scanning direction, which is orthogonal to a direction in which an original is conveyed, or orthogonal to a direction in which the reading unit moves. FIG. 19 is a schematic diagram of the alignment of CMOS sensors in the related art.

The CMOS sensors include three light receiving element lines arranged at given intervals in a sub-scanning direction and, in each light receiving element line, as many light receiving elements as necessary for the resolution of the CMOS sensors are aligned in a single line in the main scanning direction. Here, a gap of one-pixel height is put between one light receiving element line and another light receiving element line in the sub-scanning direction. The three light receiving element lines are a light receiving element line for reading an R image, a light receiving element line for reading a G image, and a light receiving element line for reading a B image. An R color filter, a G color filter, and a B color filter are therefore formed by application on light receiving surfaces of the three light receiving element lines, respectively. The color filters separate the colors of light diffused by an original, and the light receiving elements receive the light passing through the color filters.

The three light receiving element lines are arranged at given intervals in the sub-scanning direction, and thus the image reading apparatus does not read an R-color image, a G-color image, and a B-color image from the same point on the original at the same timing. The image reading apparatus therefore coordinates an R reading point, a G reading point, and a B reading point so that the three reading points are in the same place by advancing or delaying the reading timing of read data of one light receiving element line from the reading timing in another light receiving element line by a length of time corresponding to the gap in the sub-scanning direction. In the example of FIG. 19, the G light receiving element line and the B light receiving element line are arranged with a gap of two-pixel height and a gap of four-pixel height, respectively, from the R light receiving element line in the sub-scanning direction. The image reading apparatus accordingly uses R-read data as it is, reads G-read data at timing that is behind or ahead of the reading timing of the R-read data by a length of time corresponding to a two-pixel height in the sub-scanning direction, and reads B-read data at timing that is behind or ahead by a four-pixel height, to thereby execute processing of putting the R-color reading point, the G-color reading point, and the B-color reading point in the same place.

With this configuration, fluctuations in the moving speed of the reading unit in platen reading, or fluctuations in the original conveying speed in flow reading cause the time intervals between R reading, G reading, and B reading to deviate from given time intervals, and the R-read data, the G-read data, and the B-read data consequently shift in the sub-scanning direction. The moving speed of the reading unit in platen reading and the original conveying speed in flow reading are herein referred to as "scanning speed". The shifts of the R-color read data, G-color read data, and the B-color read data in the sub-scanning direction are herein referred to as "sub-scanning color shifts". When the sub-scanning color shifts occur, the outline of an achromatic image is colored, and a monochromatic line is misread as a color line in some cases. As a solution to sub-scanning color shifts, a method is proposed in Japanese Patent Application Laid-open No. Hei 11-112749, which involves detecting the scanning speed when an image is read and correcting the amounts of shifts of the read data in the sub-scanning direction.

There are other causes of sub-scanning color shifts than the scanning speed fluctuations described above, and there are many color shifts that are difficult to detect in advance, for example, a shift in the focal point of a CMOS sensor due to vibrations of the image reading apparatus, and a shift in the focal point due to the flapping of the original in flow reading.

The present invention has been made in view of the problem described above, and an object of the present invention is therefore to provide an image reading apparatus capable of correcting sub-scanning color shifts that are caused by various causes.

SUMMARY OF THE INVENTION

An image reading apparatus according to the present disclosure includes a reader unit configured to generate read data by reading the image with a sensor having a plurality of line sensors, each line sensor including a plurality of light receiving elements aligned in a first direction, the plurality of line sensors are arranged in a second direction orthogonal to a first direction, and the light receiving elements comprising a plurality of first light receiving elements configured to receive light of a first color and a plurality of second light receiving elements configured to receive light of a second color, which differs from the first color; a storage unit configured to store a condition for determining whether or not the read data needs to be corrected; a determining unit configured to determine whether or not the read data needs to be corrected from the read data that is obtained from the reader unit and from the condition that is stored in the storage unit; and a corrector configured to correct the read data based on a result of the determination executed by the determining unit.

Further features of the present invention will become apparent from the following description of exemplary embodiments (with reference to the attached drawings).

DESCRIPTION OF THE EMBODIMENTS

Embodiments of the present invention are described below in detail with reference to the drawings.

First Embodiment

Image Reading Apparatus

Figure 1:
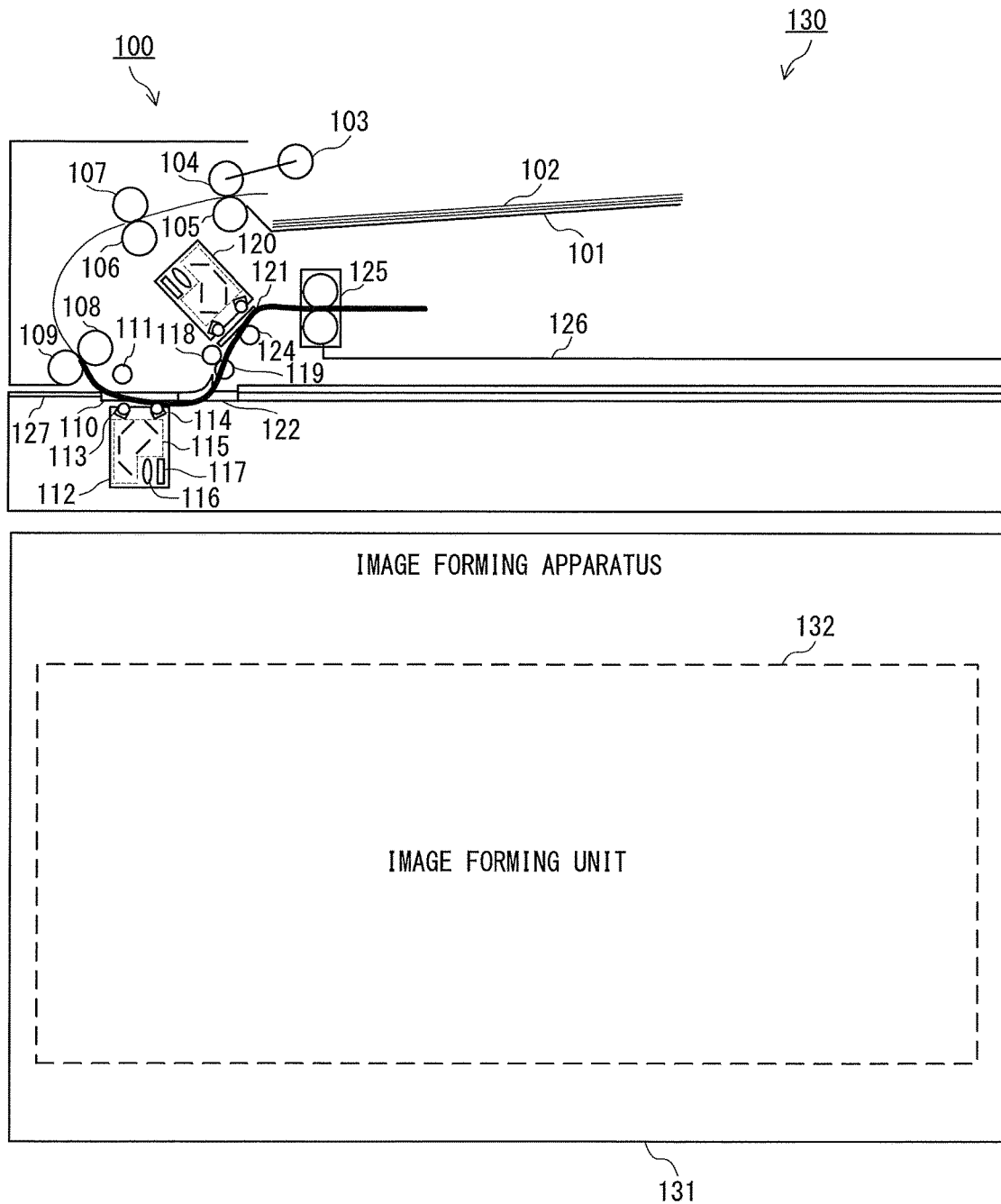
FIG. 1 is a diagram for illustrating the configuration of an image reading apparatus.

FIG. 1 is a diagram for illustrating a digital color multifunction peripheral as an example of an image forming system 130, which includes an image reading apparatus 100 according to a first embodiment of the present invention. The image forming system 130 includes the image reading apparatus 100 and an image forming apparatus 131.

The image forming apparatus 131 includes an image forming unit 132 configured to form an image by a known electrophotography method. The image forming unit 132 includes a photosensitive member, an exposure unit, a developing unit, a transfer unit, and a fixing unit. The exposure unit is configured to form an electrostatic latent image on the photosensitive member based on image data that is obtained from the image reading apparatus 100. The developing unit is configured to develop the electrostatic latent image into a developer image with the use of a developer. The transfer unit is configured to transfer the developer image onto a recording medium conveyed to the transfer unit. The fixing unit is configured to fix the developer image onto the recording medium. The image reading apparatus 100 is equipped with an automatic document feeder mechanism, and is capable of reading images on the front and back sides of an original 102 from which an image is to be read, with a front-side reader 112 and a back-side reader 120, while conveying the original 102.

The automatic document feeder mechanism includes an original tray 101 on which the original 102 is put, and a conveying path along which the original 102 is conveyed from the original tray 101 to a reading position and is discharged onto a discharge tray 126 after image reading is finished. The conveying path is provided with a sheet feeding roller 103, a separating/conveying roller 104, a separating/conveying driven roller 105, a registration roller 106, a registration driven roller 107, a lead roller 108, a lead driven roller 109, a lead discharge roller 118, and a lead discharge driven roller 119. A flow reading glass 110, which is a reading position where an image on the front side of the original 102 is read, and a flow reading glass 121, which is a reading position where an image on the back side of the original 102 is read, are provided in places along the conveying path. A platen roller 111 is arranged so as to face the flow reading glass 110 across the conveying path. A platen roller 124 is arranged so as to face the flow reading glass 121 across the conveying path.

The sheet feeding roller 103 is provided above the original tray 101, and is driven and rotated by the same motor (not shown) that is used to drive the separating/conveying roller 104, thereby feeding the original 102 from the original tray 101 onto the conveying path. The sheet feeding roller 103 is usually evacuated to a home position, which is above the original tray 101 and, when sheet feeding operation is started, drops down to come into contact with the upper surface of the original 102. The sheet feeding roller 103 is axially supported by an arm (not shown), and moves up and down with the swinging motion of the arm.

The separating/conveying driven roller 105 is arranged so as to face the separating/conveying roller 104 across the conveying path, and is pressed toward the separating/conveying roller 104. The separating/conveying driven roller 105 is formed of a rubber material or a similar material that is slightly less in friction than the separating/conveying roller 104, and is configured to cooperate with the separating/conveying roller 104 in separating and conveying sheets of the original 102 fed by the sheet feeding roller 103, one sheet at a time. The registration roller 106 and the registration driven roller 107 are configured to align the front edge in the conveying direction of the fed original 102. The front edge of the original 102 is aligned by bringing the front edge in the conveying direction of the original 102 into abutment against a nip portion between the registration roller 106 that is stationary at the moment and the registration driven roller 107, and thus creating a loop from the original 102. The lead roller 108 and the lead driven roller 109 are configured to convey the original 102 whose front edge has been aligned toward the flow reading glass 110.

A white reference plate 127 is connected to the flow reading glass 110. The white reference plate 127 is read by the front-side reader 112 when a coefficient for correcting the white reference of each pixel is generated. The white reference correction is called "shading correction". A coefficient for shading correction is called a "shading coefficient".

The front-side reader 112 is configured to read an image on the front side of the original 102 when the original 102 passes through the flow reading glass 110. The lead discharge roller 118 and the lead discharge driven roller 119 are configured to convey the original 102 from which an image on the front side has been read to the flow reading glass 121, which is a reading position where the back-side reader 120 reads an image. In order to sweep up and lift the original 102 toward the back-side reader 120, a jump ramp 122 is provided in a place along the conveying path between the flow reading glass 110 and the flow reading glass 121. The platen roller 124 arranged so as to face the flow reading glass 121 across the conveying path is white, and also serves as a white reference plate for generating a shading coefficient of the back side of the original 102.

The back-side reader 120 is configured to read an image on the back side of the original 102 when the original 102 flows over the flow reading glass 121. Sheet discharge rollers 125 are configured to discharge the original 120 from which an image on the back side has been read onto the discharge tray 126.

The front-side reader 112 and the back-side reader 120 have the same configuration. Here, the configuration of the front-side reader 112 is described and a description on the configuration of the back-side reader 120 is omitted. The front-side reader 112 is a reading unit that includes white LEDs 113 and 114, which are light emitters, CMOS sensors 117, which are light receivers, a mirror group 115, and a lens 116. Light emitting elements other than the white LEDs 113 and 114 may be used as the light emitters as long as the elements are white light sources. The light receiver may use a CCD sensor or the like instead of a CMOS sensor as a light receiving element. The front-side reader 112 is a linear sensor, and aligns a plurality of white LEDs and a plurality of CMOS sensors in a main scanning direction, which is orthogonal to a direction in which the original 102 is conveyed.

The white LEDs 113 and 114 are configured to emit light, when the original 102 flows over the flow reading glass 110, to irradiate the front side of the original 102. The front side of the original 102 reflects the light radiated from the white LEDs 113 and 114. The light reflected by the front side of the original 102 is diffused light. The diffused light is reflected by the mirror group 115 toward the lens 116. The lens 116 is configured to collect the diffused light on light receiving surfaces of the CMOS sensors 117. Each CMOS sensor 117 performs photoelectric conversion on the received light to output an analog electric signal whose intensity is determined by the amount of the received light (light reception result).

CMOS Sensor

Figure 2A:
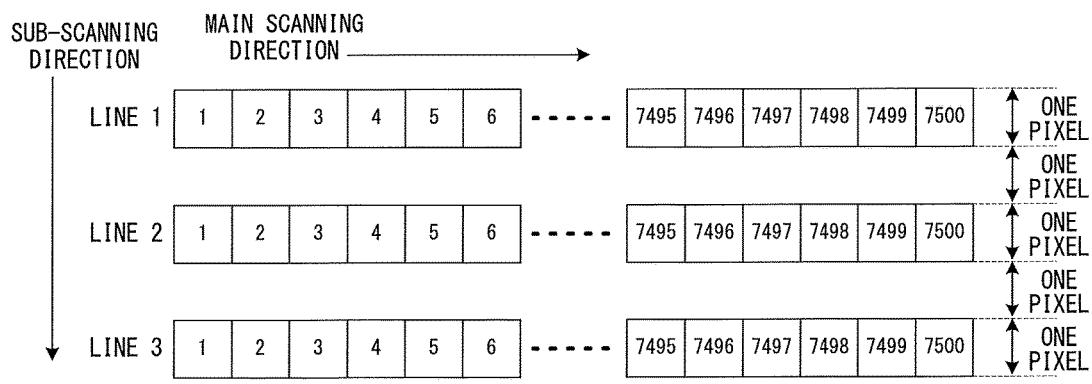
FIG. 2A and FIG. 2B are explanatory diagrams of CMOS sensors.
Figure 2B:
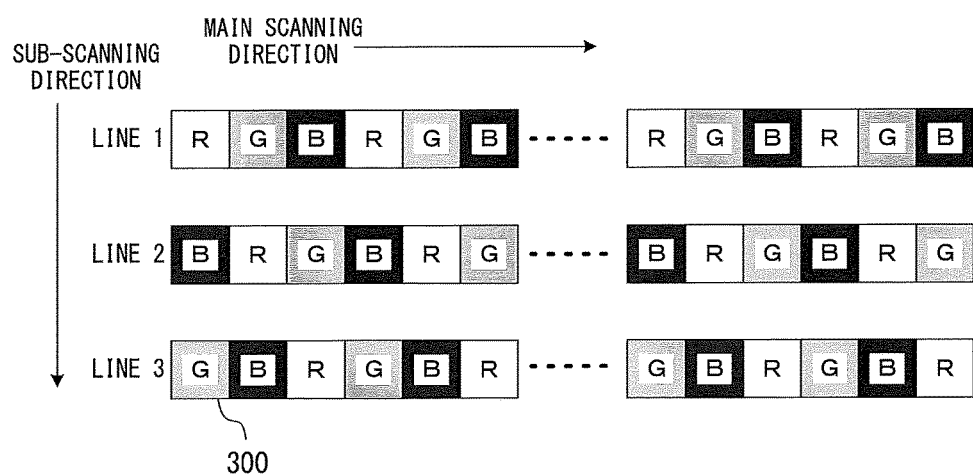

FIG. 2A and FIG. 2B are explanatory diagrams of the CMOS sensors 117. As illustrated in FIG. 2A, each CMOS sensor 117 is a line sensor that includes a plurality of light receiving element lines in a sub-scanning direction (the conveying direction), and each light receiving element line includes, in the main scanning direction of the original 102, as many light receiving elements as necessary for a required resolution. The CMOS sensor 117 in the first embodiment includes, in the sub-scanning direction, three light receiving element lines each of which includes, in the main scanning direction, light receiving elements equivalent to 7,500 pixels. The three light receiving element lines are arranged with a gap of one-pixel height put between one line and another in the sub-scanning direction. In the first embodiment, the three light receiving element lines are discriminated from one another by denoting the lines as "Line 1", "Line 2", and "Line 3" in order from the top of FIG. 2A and FIG. 2B downward. The position of an image read by Line 1 and the position of an image read by Line 2 are apart from each other by two-pixel height. The position of an image read by Line 1 and the position of an image read by Line 3 are apart from each other by four-pixel height.

FIG. 2B is a diagram for illustrating the arrangement of color filters that are formed by application on the light receiving elements. Filters of three colors are used as color filters 300, namely, a filter (R) through which red light is transmitted, a filter (G) through which green light is transmitted, and a filter (B) through which blue light is transmitted. The color filters 300 in Lines 1, 2, and 3 are formed by application in an orderly manner in which a cycle of R followed by G and then B is repeated. The orderly application arrangement of R→G→B in Line 2 is staggered from the orderly application arrangement of R→G→B in Line 1 by one pixel in the main scanning direction. The orderly application arrangement of R→G→B in Line 3 is staggered from the orderly application arrangement of R→G→B in Line 1 by two pixels in the main scanning direction. The color filters 300 are thus formed by application in a staggered pattern of R, G, and B. In other words, color filters of different colors are formed on light receiving elements that are adjacent to each other in the main scanning direction, and on light receiving elements that are adjacent to each other in the sub-scanning direction, so that adjacent light receiving elements receive light beams of different colors. Methods other than using the color filters 300 may be employed to give a staggered pattern of FIG. 2B to beams of light that are received by red light receiving elements, green light receiving elements, and blue light receiving elements. For example, the color of light that can be received by a light receiving element may be determined by varying the light reception characteristics of the light receiving element depending on the color.

Control System

Figure 3:
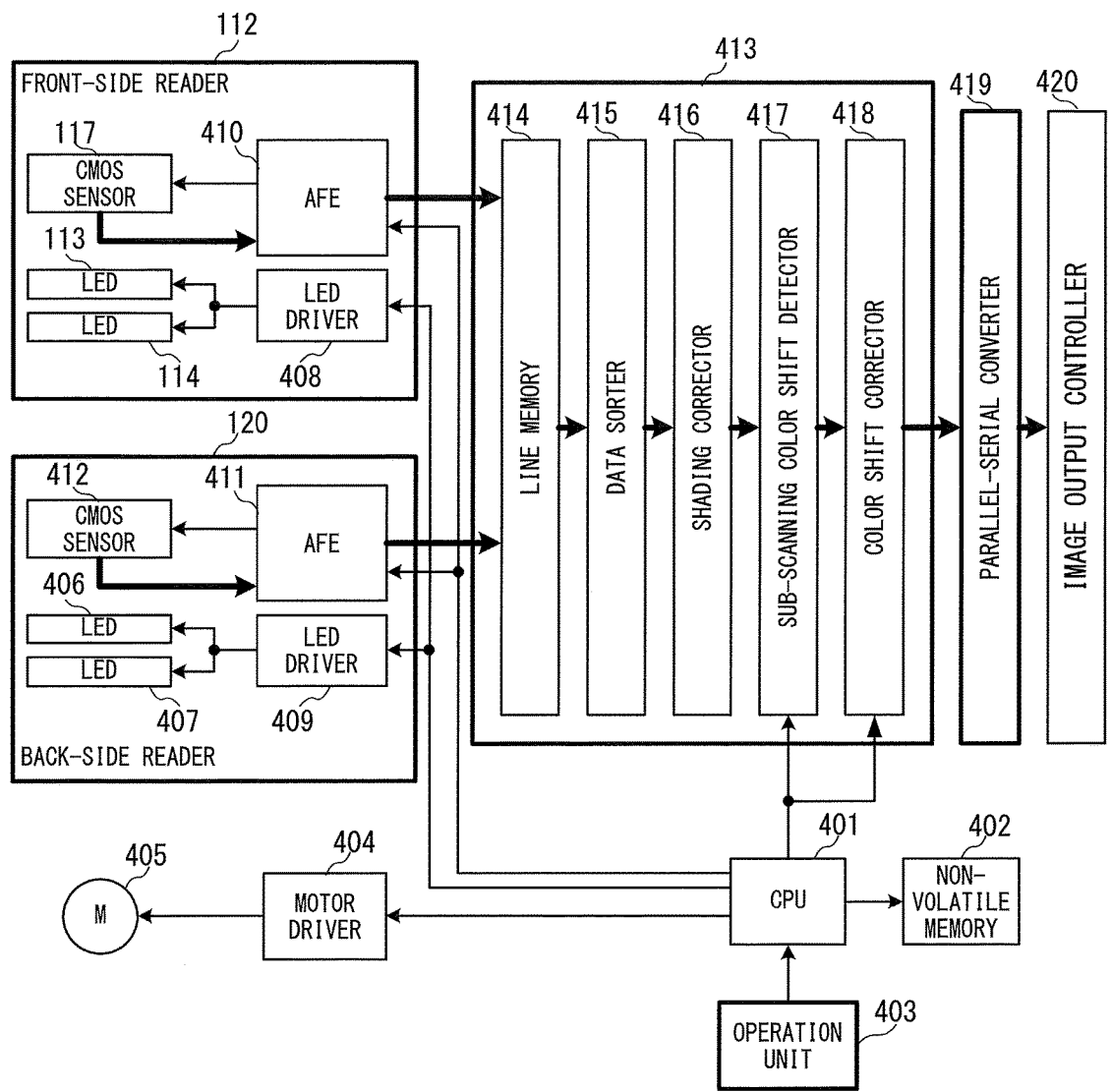
FIG. 3 is a block diagram of a controller.

FIG. 3 is a block diagram of a controller configured to control the operation of the thus configured image reading apparatus 100. The controller is built inside the image reading apparatus 100. The controller is a computer that includes a central processing unit (CPU) 401, a non-volatile memory 402, an image processor 413, a parallel-serial converter 419, and an image output controller 420. The front-side reader 112, the back-side reader 120, an operation unit 403, and a motor driver 404 are connected to the controller.

The CPU 401 is configured to control the overall operation of the image reading apparatus 100 by executing a control program that is stored in the non-volatile memory 402. The CPU 401 sets a condition for detecting sub-scanning color shifts and a condition for correcting sub-scanning color shifts. The operation unit 403 is a user interface used to set a double-sided reading mode for reading both sides of the original 102, the transmission destination of image data that represents a read image, and other settings. The settings input through the operation unit 403 are transmitted to the CPU 401. The CPU 401 controls the operation of the motor driver 404, and the motor driver 404 under control of the CPU 401 runs a motor 405, which is a driving source configured to drive and rotate the rollers provided in the image reading apparatus 100. While only one pair of the motor 405 and the motor driver 404 is illustrated in FIG. 3, a plurality of pairs of the motor 405 and the motor driver 404 are provided in actuality. The motor driver 404 supplies the motor 405 with an excitation current for controlling the rotation of the motor 405 in response to a timing signal obtained from the CPU 401.

The front-side reader 112 and the back-side reader 120 include, in addition to the CMOS sensor 117, a CMOS sensor 412, the white LEDs 113 and 114, and white LEDs 406 and 407, an LED driver 408 and an LED driver 409, respectively, and an analog front end (AFE) 410 and an AFE 411, respectively.

The CPU 401 controls the operation of the LED drivers 408 and 409, and the LED drivers 408 and 409 under control of the CPU 401 control the light emission of the white LEDs 113 and 114 and the white LEDs 406 and 407, respectively. The LED drivers 408 and 409 supply the white LEDs 113 and 114 and the white LEDs 406 and 407, respectively, with a current for light emission in response to a timing signal obtained from the CPU 401. The AFEs 410 and 411 perform sample-and-hold processing, offset processing, gain processing, and other types of analog processing on an analog electric signal output from the CMOS sensor 117 and an analog electric signal output from the CMOS sensor 412, respectively, to convert the analog signal into read data, which is a digital signal. The read data is transmitted to the image processor 413. The read data indicates, for example, the luminance value of an image.

The image processor 413 is configured to perform given image processing on read data obtained from the front-side reader 112 and read data obtained from the back-side reader 120, to output the results. The image processing executed by the image processor 413 includes sorting the read data by color into R-read data, G-read data, and B-read data, shading correction, sub-scanning color shift correction, and other corrections. Details of the image processor 413 are described later.

The parallel-serial converter 419 is configured to convert post-image processing read data output from the image processor 413 as parallel data into serial data. The image output controller 420 is configured to output read data converted into serial data as image data. The image data is transmitted to the image forming apparatus 131. In the case where the image reading apparatus 100 is connected to a personal computer or other information processing apparatus, the image data is transmitted to the information processing apparatus.

Image Processor

The image processor 413 includes a line memory 414, a data sorter 415, a shading corrector 416, a sub-scanning color shift detector 417, and a color shift corrector 418.

The line memory 414 is configured to store five lines of read data that is read by Lines 1, 2, and 3 and that is output from the AFE 410 of the front-side reader 112, and five lines of read data that is read by Lines 1, 2, and 3 and that is output from the AFE 411 of the back-side reader 120.

The data sorter 415 is configured to sort, by color, data that is read by Lines 1, 2, and 3 and stored in the line memory 414 into R-read data, G-read data, and B-read data. The read data stored in the line memory 414 is disorganized in terms of the colors R, G, and B because the color filters 300 of R, the color filters 300 of G, and the color filters 300 of B are formed by application on the light receiving surface of the CMOS sensor 117 in a staggered pattern as illustrated in FIG. 2A and FIG. 2B. In addition, because the Lines 2 and 3 are arranged at a distance of two pixels and a distance of four pixels, respectively, from Line 1 in the sub-scanning direction, the position of read data of Line 2 and the position of read data of Line 3 are staggered with respect to Line 1 in the sub-scanning direction by two-pixel height and four-pixel height, respectively. The data sorter 415 accordingly sorts the read data by color into R-read data, G-read data, and B-read data, and shifts the data read by Line 2 by two-pixel height and data read by Line 3 by four-pixel height in the sub-scanning direction, thereby generating correct R-read data, G-data, and B-read data.

The shading corrector 416 is configured to perform shading correction processing with the use of a shading coefficient on R-read data, G-read data, and B-read data sorted by the data sorter 415 by color.

The sub-scanning color shift detector 417 is configured to detect the site of a color shift in the sub-scanning direction from read data corrected by shading correction. The original 102 flaps in the image reading apparatus 100 when the front edge of the original 102 is pushed onto the flow reading glass 110 for the document's front side and the flow reading glass 121 for the document's back side, and when the rear edge of the original 102 is pulled out. The flapping causes the conveying speed of the original 102 to deviate from a given speed, which in turn causes a sub-scanning color shift. Fluctuations in the number of revolutions of the motor 405, diameter fluctuations among rollers used to convey the original 102, and the like also cause the conveying speed of the original 102 to deviate from the given speed, and ultimately cause a sub-scanning color shift. The sub-scanning color shift detector 417 identifies the site of the sub-scanning color shift from the regularity (pattern) of succession of R-read data, G-read data, and B-read data in the main scanning direction. Processing of detecting a sub-scanning color shift is described below.

Sub-Scanning Color Shift

Figure 4:
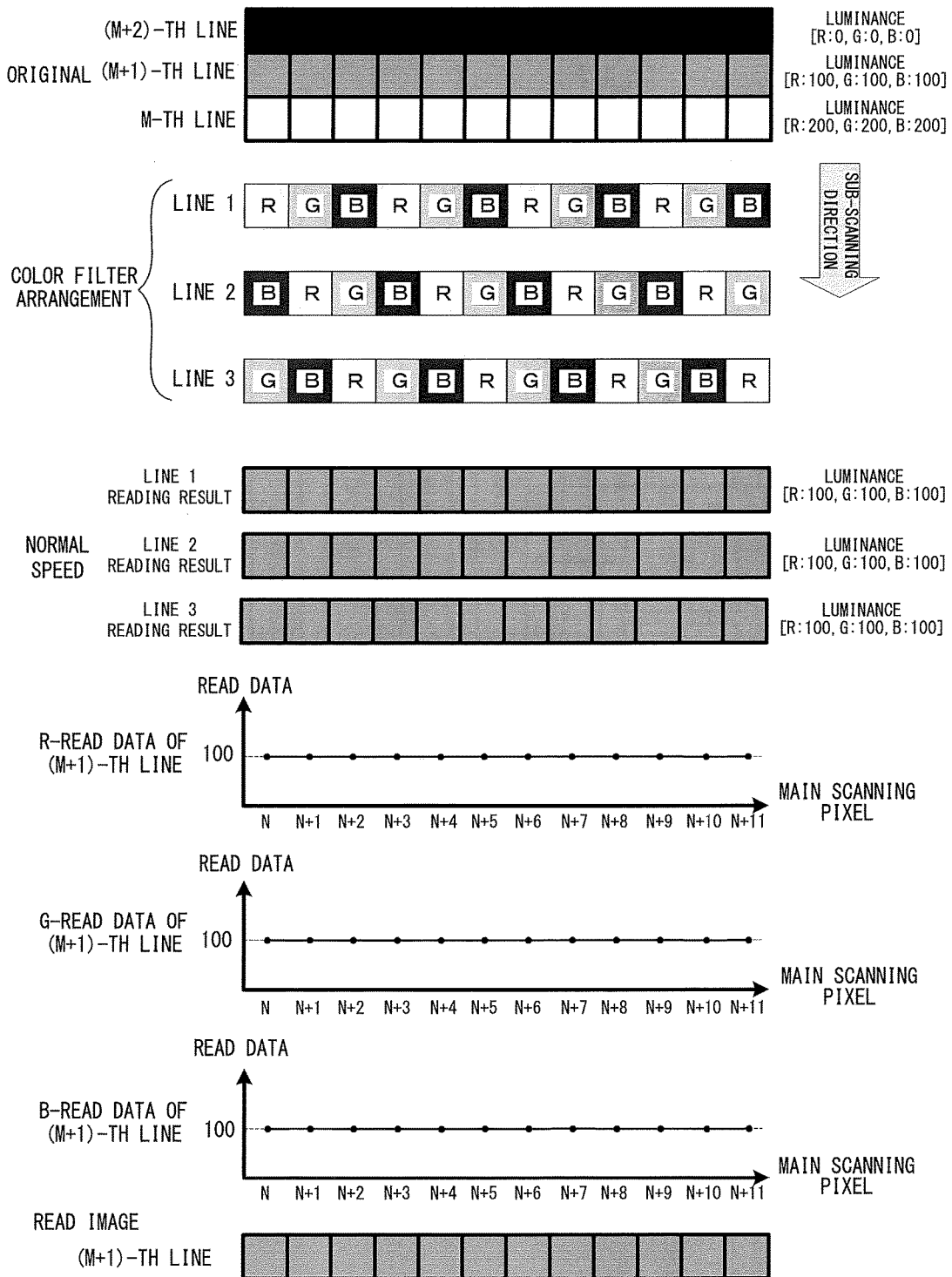
FIG. 4 is an explanatory diagram of a read image.
Figure 5:
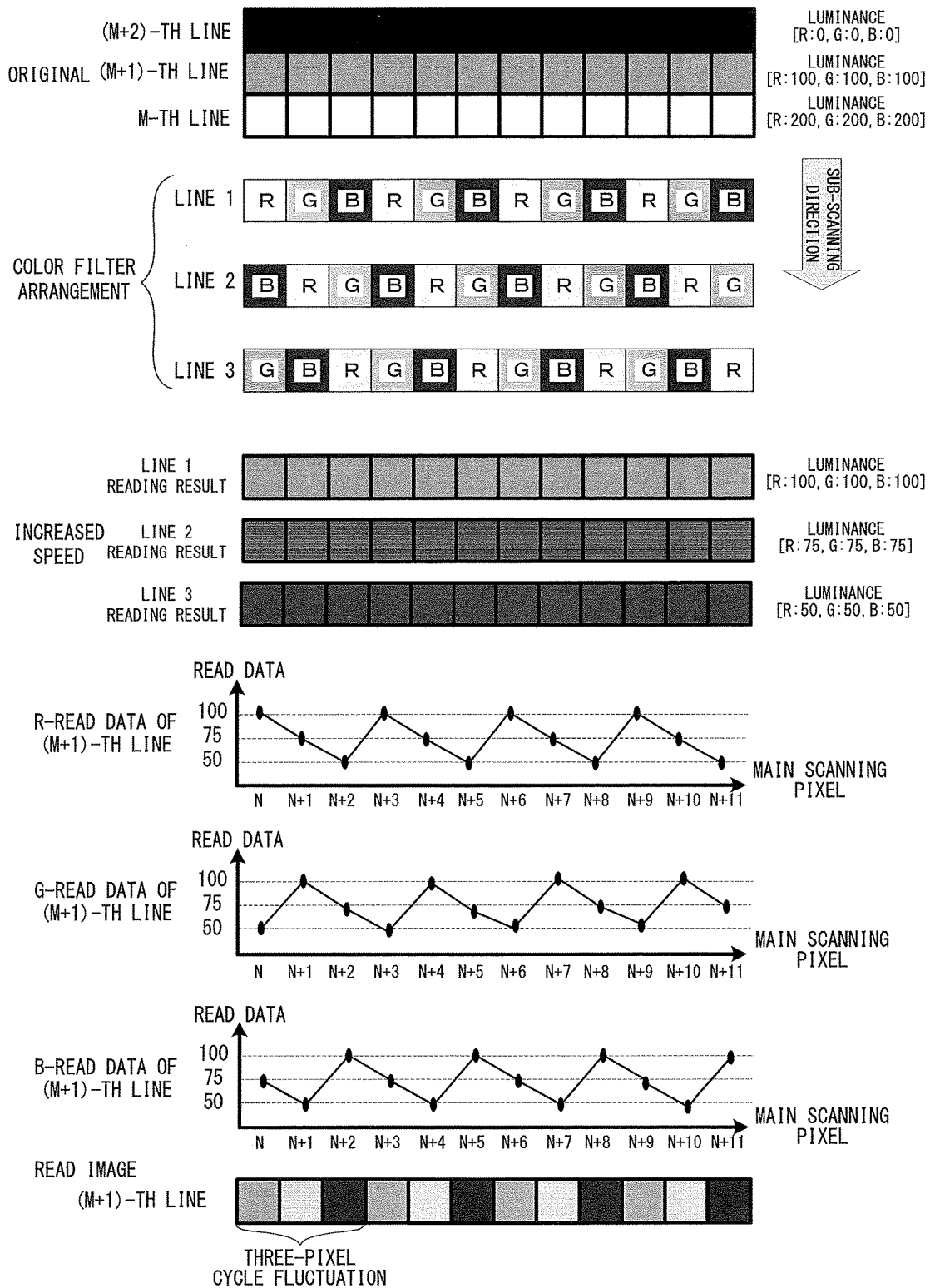
FIG. 5 is an explanatory diagram of the read image.
Figure 6:
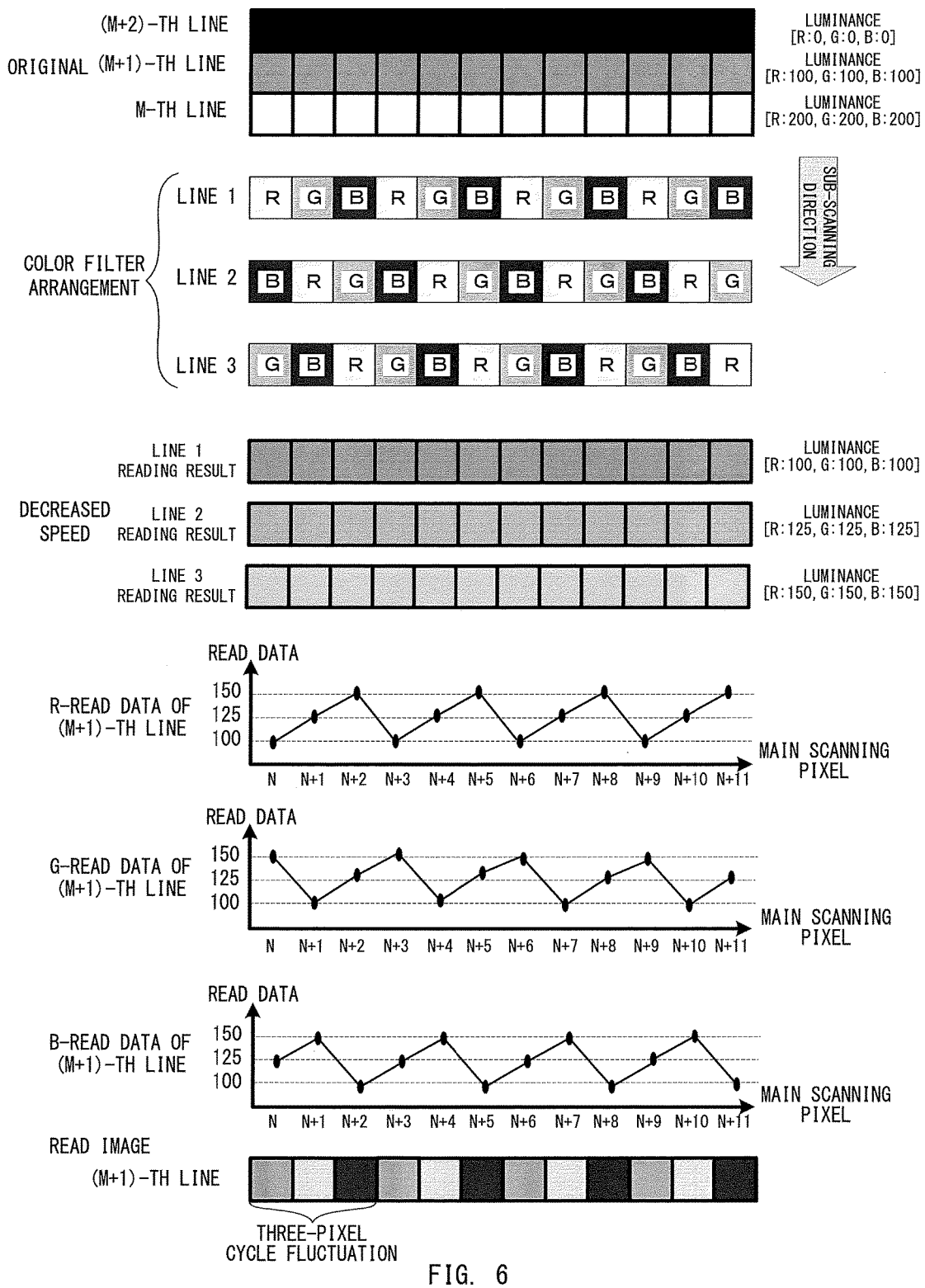
FIG. 6 is an explanatory diagram of the read image.

FIG. 4 to FIG. 6 are explanatory diagrams of a read image that is read by the CMOS sensors 117. FIG. 4 is an explanatory diagram of the read image in the case where there is no sub-scanning color shift. FIG. 5 is an explanatory diagram of the read image in the case where the conveying speed of the original 102 accidentally increases by degrees from the given speed. FIG. 6 is an explanatory diagram of the read image in the case where the conveying speed of the original 102 accidentally decreases by degrees from the given speed.

The case illustrated in FIG. 4 to FIG. 6 is a case of reading an image in a particular line (the (M+1)-th line) in the sub-scanning direction of the original 102. An image on the original 102 has a constant luminance in the main scanning direction. In an M-th line, each luminance of R, G, and B is "200", which translates into a color white. In the (M+1)-th line, which is behind the M-th line by one line, each luminance of R, G, and B is "100", which translates into a color gray. In an (M+2)-th line, which is behind the M-th line by two lines, each luminance of R, G, and B is "0", which translates into a color black. In other words, the original 102 changes color in the sub-scanning direction from white (each luminance of R, G, and B is "200") to gray (each luminance of R, G, and B is "100"), and then to black (each luminance of R, G, and B is "0").

As illustrated in FIG. 4, read data of each pixel in the (M+1)-th line in the sub-scanning direction of the original 102 that is read by Lines 1, 2, and 3 (each luminance of R, G, and B is "100") takes a value close to "100" for each of R-read data, G-read data, and B-read data, when the conveying speed of the original 102 is constant. This substantially matches the luminance of the original 102.

When the conveying speed of the original 102 accidentally increases by degrees from the given speed, Line 2 reads a place that is closer to the (M+2)-th line than to the place supposed to be read as illustrated in FIG. 5. Line 3 reads a place that is further closer to the (M+2)-th line than to the place supposed to be read. In this case, read data of Line 1 is "100". Read data of Line 2 is "75", which is a value between the luminance "100" of the (M+1)-th line and the luminance "0" of the (M+2)-th line. Line 3 reads a place further closer to the (M+2)-th line, and the resultant read data is "50". This is merely an example, and the read data varies depending on how the reading speed fluctuates.

When the conveying speed of the original 102 accidentally decreases by degrees from the given speed, Line 2 reads a place that is closer to the M-th line than to the place supposed to be read as illustrated in FIG. 6. Line 3 reads a place that is further closer to the M-th line than to the place supposed to be read. In this case, read data of Line 1 is "100". Read data of Line 2 is "125", which is a value between the luminance "200" of the M-th line and the luminance "100" of the (M+1)-th line. Line 3 reads a place further closer to the M-th line, and the resultant read data is "150". This is merely an example, and the read data varies depending on how the reading speed fluctuates.

Figure 7:
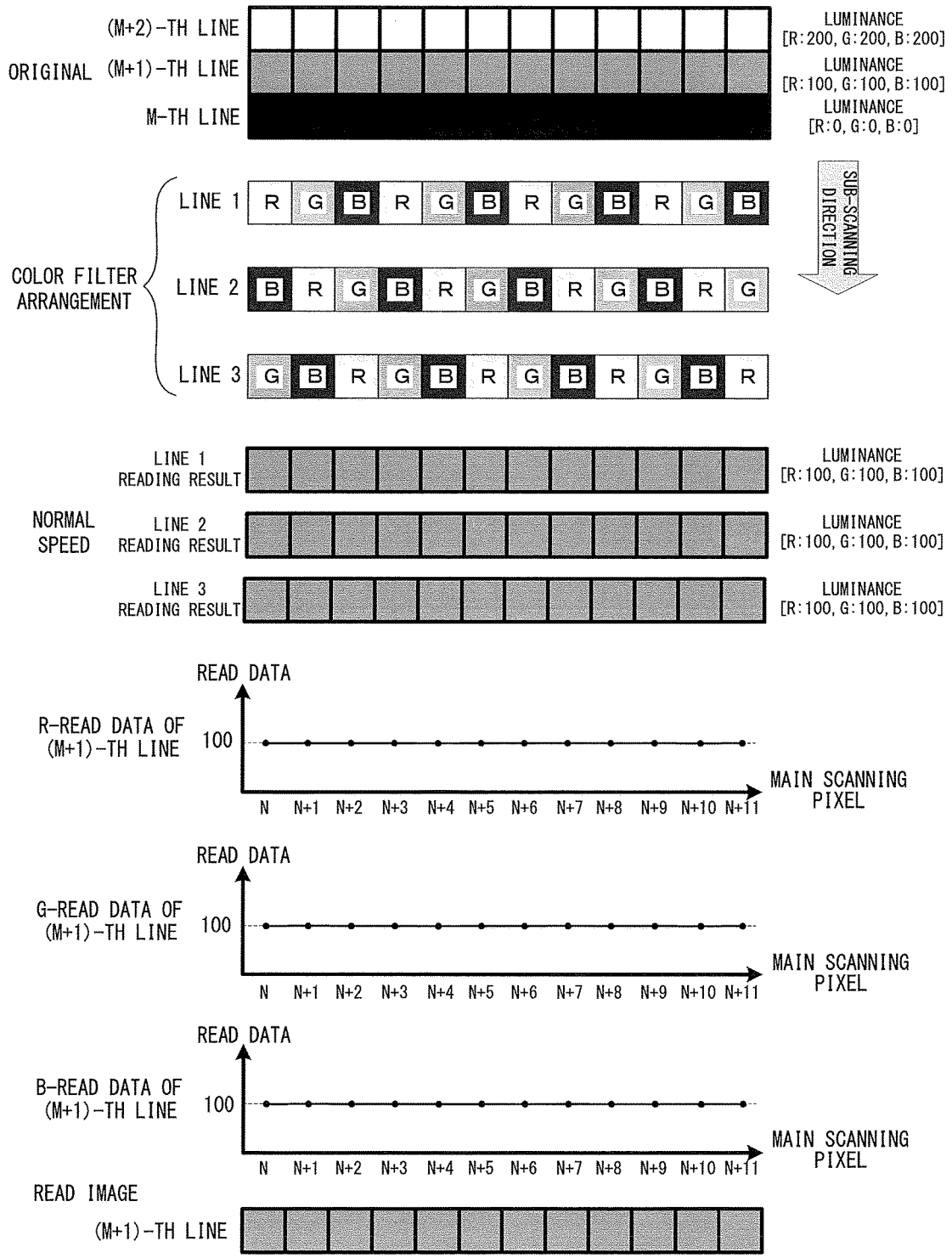
FIG. 7 is an explanatory diagram of another read image.
Figure 8:
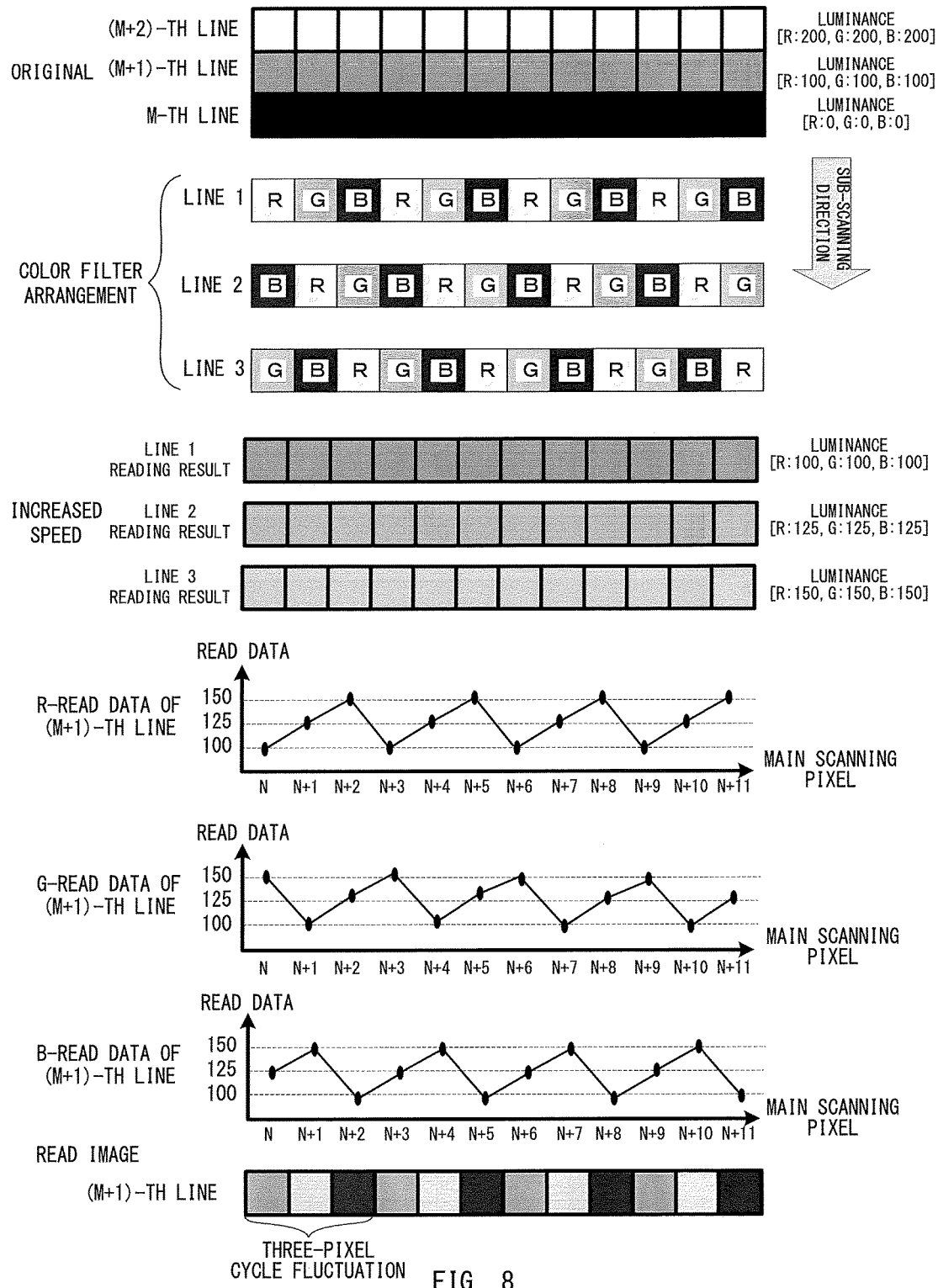
FIG. 8 is an explanatory diagram of the read image of FIG. 7.
Figure 9:
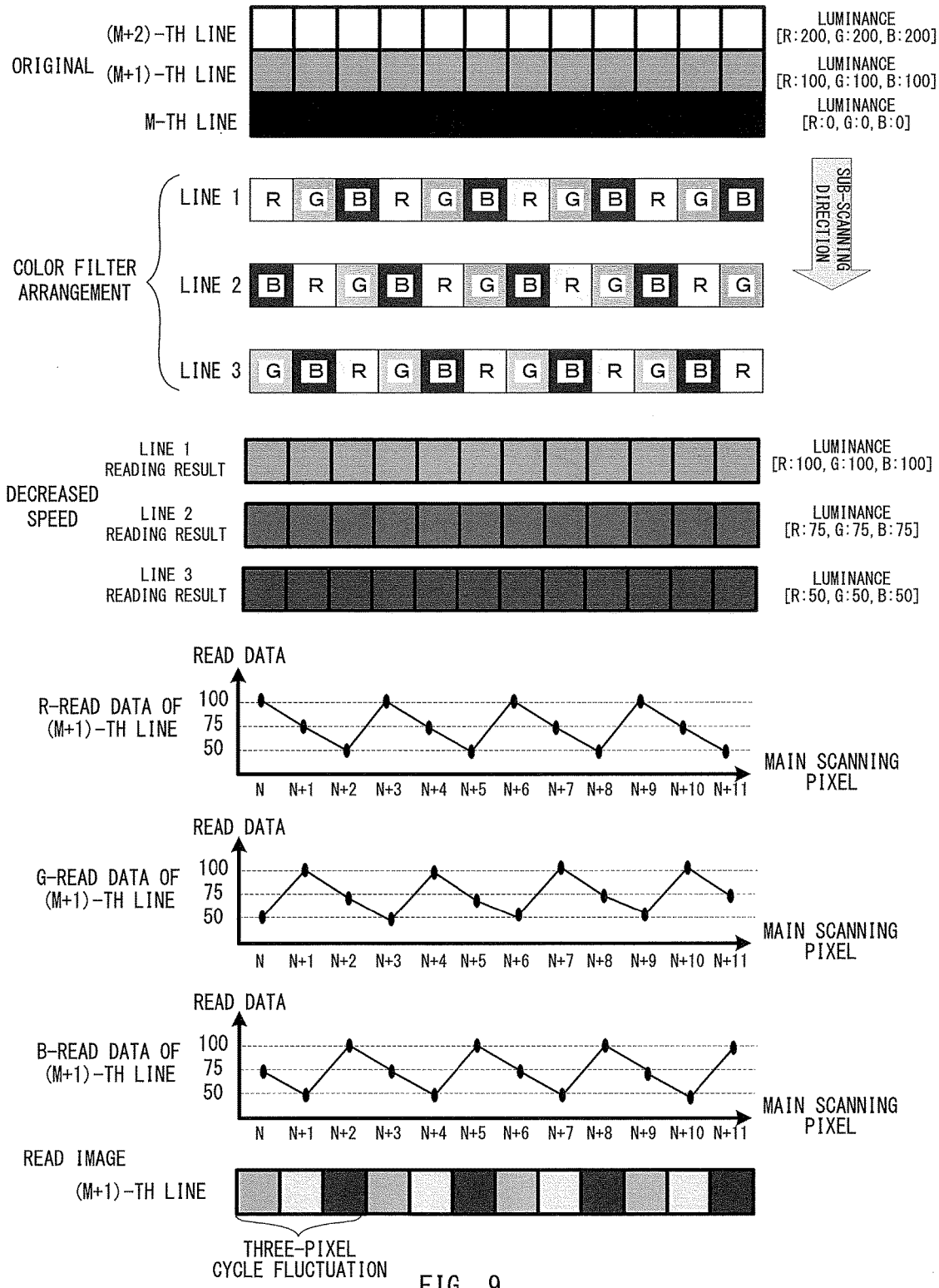
FIG. 9 is an explanatory diagram of the read image of FIG. 7.

FIG. 7 to FIG. 9 are explanatory diagrams of another read image that is read by the CMOS sensors 117. FIG. 7 is an explanatory diagram of the read image in the case where there is no sub-scanning color shift. FIG. 8 is an explanatory diagram of the read image in the case where the conveying speed of the original 102 accidentally increases by degrees from the given speed. FIG. 9 is an explanatory diagram of the read image in the case where the conveying speed of the original 102 accidentally decreases by degrees from the given speed. The case illustrated in FIG. 7 to FIG. 9 is a case of reading an image in a particular line (the (M+1)-th line) in the sub-scanning direction of the original 102.

A difference from the case illustrated in FIG. 4 to FIG. 6 is the luminance of the original 102 in the sub-scanning direction. The luminance of R, G, and B in the M-th line are each "0", which translates into a color black. In the (M+1)-th line, which is behind the M-th line by one line, each luminance of R, G, and B is "100", which translates into a color gray. In the (M+2)-th line, which is behind the M-th line by two lines, each luminance of R, G, and B is "200", which translates into a color white. In other words, the original 102 that is read in FIG. 7 to FIG. 9 changes color in the sub-scanning direction from black (each luminance of R, G, and B is "0") to gray (each luminance of R, G, and B is "100"), and then to white (each luminance of R, G, and B is "200") in an order reverse to the color change order of the original 102 of FIG. 4 to FIG. 6.

As illustrated in FIG. 7, read data of each pixel in the (M+1)-th line in the sub-scanning direction of the original 102 that is read by Lines 1, 2, and 3 (each luminance of R, G, and B is "100") takes a value close to "100" for each of R-read data, G-read data, and B-read data, when the conveying speed of the original 102 is constant. This substantially matches the luminance of the original 102.

When the conveying speed of the original 102 accidentally increases by degrees from the given speed, Line 2 reads a place that is closer to the (M+2)-th line than to the place supposed to be read as illustrated in FIG. 8. Line 3 reads a place that is further closer to the (M+2)-th line than to the place supposed to be read. In this case, read data of Line 1 is "100". Read data of Line 2 is "125", which is a value between the luminance "100" of the (M+1)-th line and the luminance "200" of the (M+2)-th line. Line 3 reads a place further closer to the (M+2)-th line, and the resultant read data is "150". This is merely an example, and the read data varies depending on how the reading speed fluctuates.

When the conveying speed of the original 102 accidentally decreases by degrees from the given speed, Line 2 reads a place that is closer to the M-th line than to the place supposed to be read as illustrated in FIG. 9. Line 3 reads a place that is further closer to the M-th line than to the place supposed to be read. In this case, read data of Line 1 is "100". Read data of Line 2 is "75", which is a value between the luminance "0" of the M-th line and the luminance "100" of the (M+1)-th line. Line 3 reads a place further closer to the M-th line, and the resultant read data is "50". This is merely an example, and the read data varies depending on how the reading speed fluctuates.

As described above with reference to FIG. 4 to FIG. 9, a luminance pattern that has a characteristic regularity of a three-pixel cycle in the main scanning direction of an image represented by read data emerges in the site of a sub-scanning color shift, irrespective of changes in concentration (luminance) in the sub-scanning direction of the original 102.

The sub-scanning color shift detector 417 determines the site of a sub-scanning color shift by detecting a luminance pattern that indicates the magnitudes of the luminance of six pixels given below. In the following description, the position of a given pixel in the main scanning direction of the original 102 is denoted by N (N<7,500), the R-luminance, G-luminance, and B-luminance of the N-th pixel are denoted by R[N], G[N], and B[N], respectively.

First Conditional Expression:

$$R[N]>R[N+1]>R[N+2]<R[N+3]>R[N+4]>R[N+5] \quad \text{(Expression 1)}$$

$$G[N]<G[N+1]>G[N+2]>G[N+3]<G[N+4]>G[N+5] \quad \text{(Expression 2)}$$

$$B[N]>B[N+1]<B[N+2]>B[N+3]>B[N+4]<B[N+5] \quad \text{(Expression 3)}$$

The sub-scanning color shift detector 417 determines that there is a sub-scanning color shift among six pixels from the N-th pixel to the (N+5)-th pixel when (Expression 1) to (Expression 3) of the first conditional expression are all satisfied simultaneously. The expressions of the first conditional expression are conditions for determining whether or not the occurrence of a sub-scanning color shift necessitates a correction of read data. The expressions of the first conditional expression are stored in the non-volatile memory 402 and, when image reading processing is executed, read by the CPU 401 to be set in the sub-scanning color shift detector 417. The sub-scanning color shift detector 417 executes pattern matching determination for the pattern of the first conditional expression to determine whether there is a sub-scanning color shift. This determination processing is for dealing with the case of FIG. 5 and FIG. 9 where the conveying speed of the original 102 accidentally decreases by degrees from the given speed.

Second Conditional Expression:

$$R[N]<R[N+1]<R[N+2]>R[N+3]<R[N+4]<R[N+5] \quad \text{(Expression 4)}$$

$$G[N]>G[N+1]<G[N+2]<G[N+3]>G[N+4]<G[N+5] \quad \text{(Expression 5)}$$

$$B[N]<B[N+1]>B[N+2]<B[N+3]<B[N+4]>B[N+5] \quad \text{(Expression 6)}$$

The sub-scanning color shift detector 417 determines that there is a sub-scanning color shift among six pixels from the N-th pixel to the (N+5)-th pixel when (Expression 4) to (Expression 6) of the second conditional expression are all satisfied simultaneously. The expressions of the second conditional expression are conditions for determining whether or not the occurrence of a sub-scanning color shift necessitates a correction of read data. The expressions of the second conditional expression are stored in the non-volatile memory 402 and, when image reading processing is executed, read by the CPU 401 to be set in the sub-scanning color shift detector 417. The sub-scanning color shift detector 417 executes pattern matching determination for the pattern of the second conditional expression to determine whether there is a sub-scanning color shift. This determination processing is for dealing with the case of FIG. 6 and FIG. 8 where the conveying speed of the original 102 accidentally increases by degrees from the given speed.

The sub-scanning color shift detector 417 executes the pattern matching determination once for every three pixels in the main scanning direction by setting N to 1, 4, 7 . . . and so on. This is because the color filters 300 of R, the color filters 300 of G, and the color filters 300 of B are formed on the CMOS sensors 117 by application in the pattern of a three-pixel cycle, and the pattern emerges once in three pixels in principle. Execution of pattern matching only at points where the pattern emerges in principle may reduce the chance of erroneously detecting a sub-scanning color shift, even when there is an image that has a pattern similar to an image of the original 102.

Figure 10:
FIG. 10 is an explanatory diagram of sub-scanning color shift correction.
Figure 10:
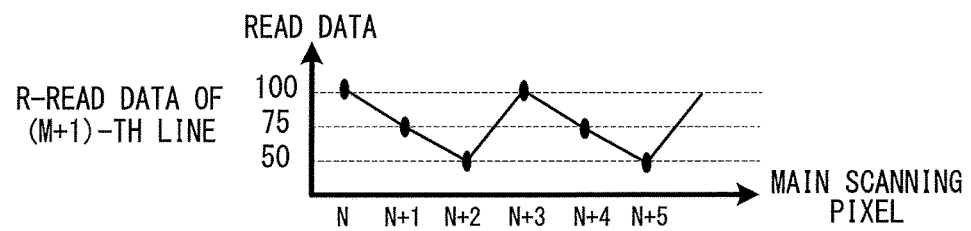
Figure 10:
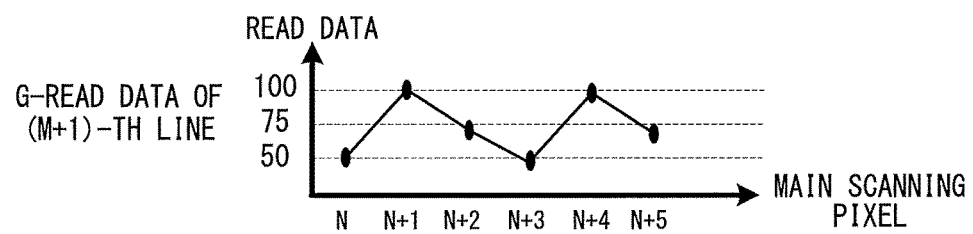
Figure 10:
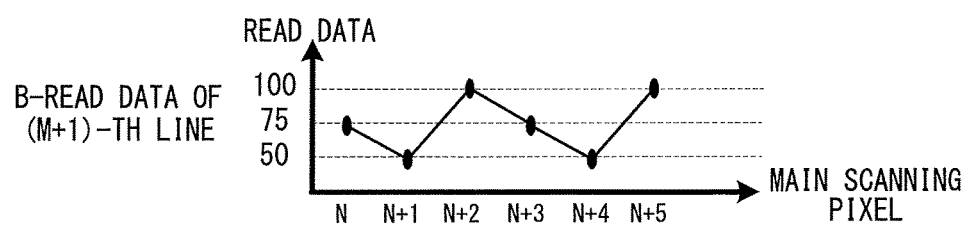
Figure 10:

The color shift corrector 418 is configured to perform a color shift correction on pixels where a sub-scanning color shift detected by the sub-scanning color shift detector 417 has occurred. FIG. 10 is an explanatory diagram of sub-scanning color shift correction. A case where it is determined that there is a sub-scanning color shift among pixels from the N-th pixel to the (N+5)-th pixel in the main scanning direction is described here. The color shift corrector 418 in this case corrects tinting that is caused accidentally by a sub-scanning color shift by converting R-read data, G-read data, and B-read data based on the following expressions.

Correction Expression:

$$R[N]=R[N] \quad \text{(Expression 7)}$$

$$R[N+1]=R[N] \quad \text{(Expression 8)}$$

$$R[N+2]=R[N] \quad \text{(Expression 9)}$$

$$R[N+3]=R[N+3] \quad \text{(Expression 10)}$$

$$R[N+4]=R[N+3] \quad \text{(Expression 11)}$$

$$R[N+5]=R[N+3] \quad \text{(Expression 12)}$$

$$G[N]=G[N+1] \quad \text{(Expression 13)}$$

$$G[N+1]=G[N+1] \quad \text{(Expression 14)}$$

$$G[N+2]=G[N+1] \quad \text{(Expression 15)}$$

$$G[N+3]=G[N+4] \quad \text{(Expression 16)}$$

$$G[N+4]=G[N+4] \quad \text{(Expression 17)}$$

$$G[N+5]=G[N+4] \quad \text{(Expression 18)}$$

$$B[N]=B[N+2] \quad \text{(Expression 19)}$$

$$B[N+1]=B[N+2] \quad \text{(Expression 20)}$$

$$B[N+2]=B[N+2] \quad \text{(Expression 21)}$$

$$B[N+3]=B[N+5] \quad \text{(Expression 22)}$$

$$B[N+4]=B[N+5] \quad \text{(Expression 23)}$$

$$B[N+5]=B[N+5] \quad \text{(Expression 24)}$$

The color shift corrector 418 uses the correction expression of (Expression 7) to (Expression 24) to correct R-read data, G-read data, and B-read data based on the luminance value of an adjacent pixel in the main scanning direction. The color shift correction in the first embodiment is made so that the luminance of a pixel of interest is matched to the luminance of the brightest pixel near the pixel of interest. The luminance of a pixel of interest may be matched to the luminance of the darkest pixel instead of the brightest pixel. In this manner, the color shift corrector 418 makes the values of pieces of R-read data substantially equal to one another, the values of pieces of G-read data substantially equal to one another, and the values of pieces of B-read data substantially equal to each other, thereby rendering a site that has unintendedly been tinted by a sub-scanning color shift achromatic. The correction expression is stored in the non-volatile memory 402 and, when image reading processing is executed, read by the CPU 401 to be set in the color shift corrector 418.

Figure 11:
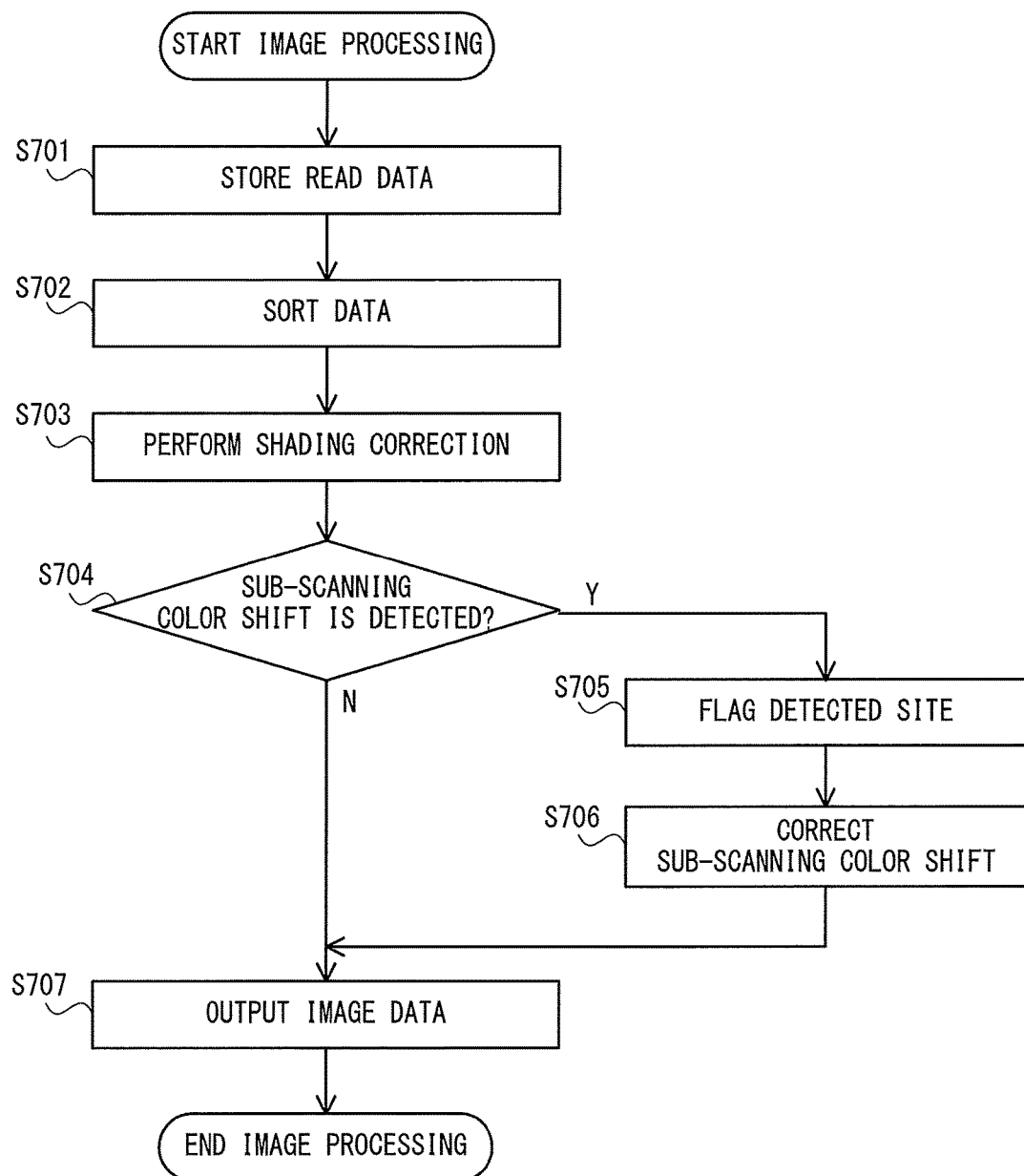
FIG. 11 is a flow chart for illustrating image processing.

FIG. 11 is a flow chart for illustrating image processing that is executed by the thus configured image processor 413. The image processor 413 starts this processing when read data is received from at least one of the front-side reader 112 and the back-side reader 120.

After obtaining the read data, the image processor 413 stores the obtained read data in the line memory 414 (Step S701). The data sorter 415 sorts, by color, the read data stored in the line memory 414 into R-read data, G-read data, and B-read data, and positions, in the sub-scanning direction, the pieces of read data that are read by Lines 1, 2, and 3 (Step S702). The shading corrector 416 performs shading correction on the sorted read data (Step S703).

The sub-scanning color shift detector 417 determines whether there is a sub-scanning color shift by performing the pattern matching determination described above, based on the regularity of the post-shading correction read data in the main scanning direction and the conditional expression set by the CPU 401 (Step S704). In this manner, the sub-scanning color shift detector 417 determines whether or not the read data needs to be corrected. In the case where there is a sub-scanning color shift (Step S704: Y), the sub-scanning color shift detector 417 determines that the read data needs to be corrected. The sub-scanning color shift detector 417 in this case detects a pixel (location) in the main scanning direction where the sub-scanning color shift has occurred. The sub-scanning color shift detector 417 flags the detected pixel in order to clearly point out the pixel where the sub-scanning color shift has occurred (Step S705). The color shift corrector 418 performs sub-scanning color shift correction on the flagged pixel, based on the correction expression set by the CPU 401 (Step S706).

After the sub-scanning color shift correction is finished, or in the case where no sub-scanning color shift is detected (Step S704: N), the color shift corrector 418 outputs the read data processed by the image processing to the parallel-serial converter 419. The parallel-serial converter 419 converts the R-read data, the G-read data, and the B-read data into serial data, and transmits the serial data to the image output controller 420. The image output controller 420 outputs the read data converted into serial data as image data that represents an image of the read original 102 (Step S707).

Figure 12:
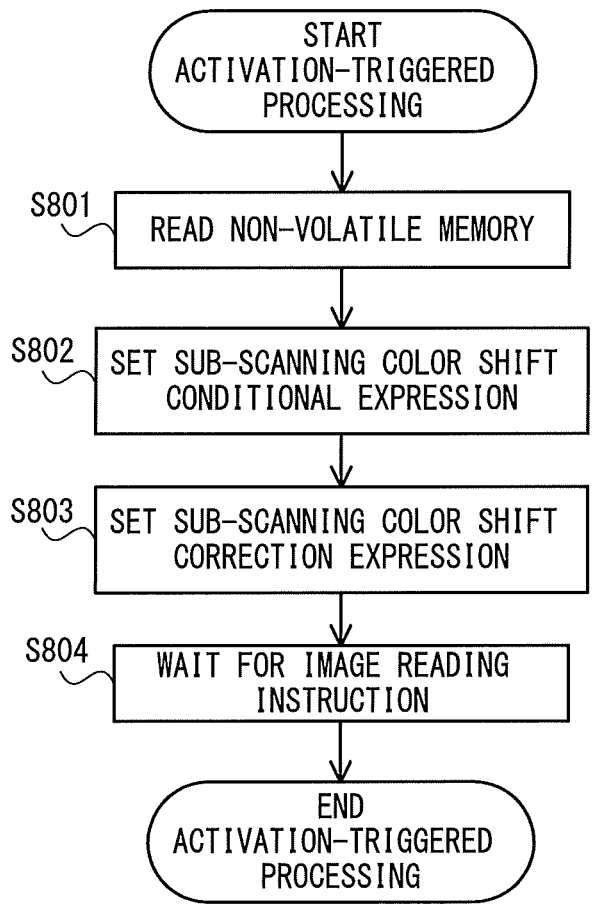
FIG. 12 is a flow chart for illustrating control processing that is executed at the time of activation.

FIG. 12 is a flow chart for illustrating control processing of the CPU 401 that is executed when the image reading apparatus 100 is activated. At the time of activation, an adjustment of the amount of light of the white LEDs 113, 114, 406, and 407 and other initial operations are executed simultaneously by executing the control program.

When the image reading apparatus 100 is activated, the CPU 401 reads the conditional expression for determining the necessity of sub-scanning color shift correction and the correction expression for correcting a sub-scanning color shift out of the non-volatile memory 402 (Step S801). The CPU 401 sets the read conditional expression in the sub-scanning color shift detector 417 (Step S802). The CPU 401 sets the read correction expression in the color shift corrector 418 (Step S803).

After setting the conditional expression and the correction expression, the CPU 401 waits for the operation unit 403 to input an image reading instruction (Step S804). The processing executed at the time of activation is now finished. When an image reading instruction is input, the CPU 401 controls the operation of the motor driver 404, the front-side reader 112, and the back-side reader 120 to execute the processing of conveying and reading the original 102. Read data that indicates the luminance of an image of the read original 102 is input to the image processor 413, where the image processing illustrated in FIG. 11 is executed. Image data generated by the image processing is output from the image reading apparatus 100. Based on the image data, the image forming apparatus 131 forms an image on a recording medium.

The image reading apparatus 100 of the first embodiment described above can bring forth a luminance pattern that is characteristic to the site of a sub-scanning color shift by receiving different colors of light with light receiving elements that are adjacent to each other in the main scanning direction and receiving different colors of light with light receiving elements that are adjacent to each other in the sub-scanning direction. The image reading apparatus 100 accordingly holds this characteristic luminance pattern in advance, and compares read data obtained by reading to the luminance pattern, which enables the image reading apparatus 100 to find out whether or not there is a sub-scanning color shift and detect the site of the sub-scanning color shift. The image reading apparatus 100 is also capable of correcting a sub-scanning color shift appropriately based on the luminance pattern of a sub-scanning color shift, thereby reducing tinting that is caused unintendedly by the sub-scanning color shift. Whether there is a sub-scanning color shift is determined from six pixels of data in the first embodiment. However, the number of pixels used for the determination is not limited to six. The image reading apparatus 100 only needs to determine whether there is a sub-scanning color shift or not based on at least the luminance pattern of a plurality of pixels. However, for a higher precision of determination about whether there is a sub-scanning color shift or not, it is preferred to use the luminance pattern of a number of pixels that is equal to or more than the number of colors found on the same line in the main scanning direction. Taking the first embodiment as an example, three colors of R, G, and B are found on the same line in the main scanning direction, and it is preferred for the image reading apparatus 100 to store a luminance pattern of three or more pixels in the non-volatile memory 402. It is particularly preferred to store a luminance pattern of six or more pixels.

Second Embodiment

An image reading apparatus according to a second embodiment of the present invention is configured to detect a change in concentration in the sub-scanning direction when an image is read. The image reading apparatus of the second embodiment has the same configuration as the one in the first embodiment, and a description on the configuration is omitted. The image reading apparatus of the second embodiment differs from that of the first embodiment in the configuration of the controller.

Figure 13:
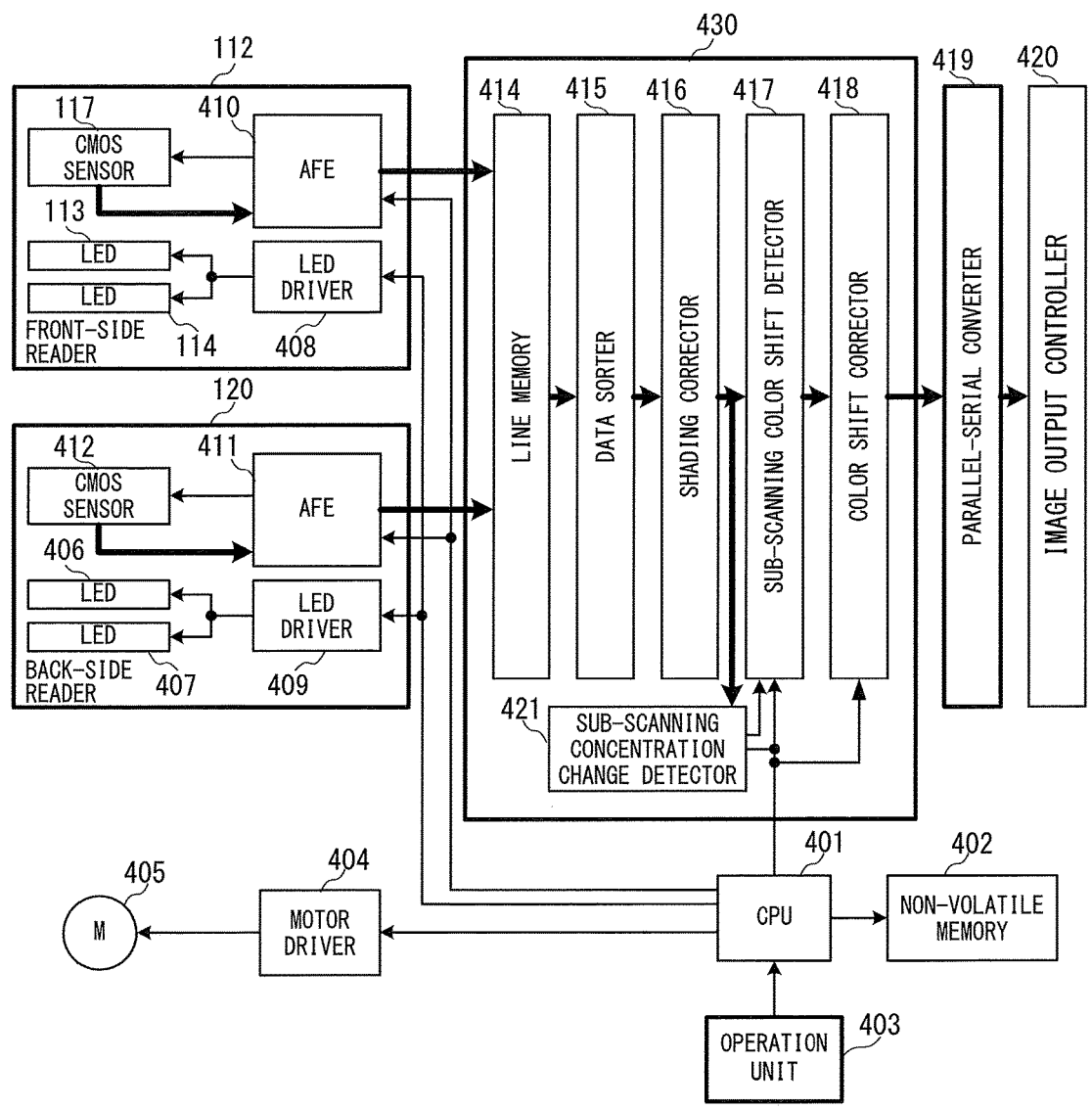
FIG. 13 is a block diagram of another controller.

FIG. 13 is a block diagram of the controller in the second embodiment. An image processor 430 of the controller includes a sub-scanning concentration change detector 421 in addition to the components of the image processor 413 of the first embodiment. Descriptions on the same components are omitted.

The sub-scanning concentration change detector 421 is capable of storing, in an internal memory, a plurality of lines of read data corrected by shading correction by the shading corrector 416. The sub-scanning concentration change detector 421 performs pattern matching on read data that is obtained from the shading corrector 416 and a plurality of lines of stored read data to calculate a difference value between an average value of read data that has previously been read and an average value of current read data. In the case of reading the (M+1)-th line of FIG. 4, for example, the sub-scanning concentration change detector 421 executes processing with data of the M-th line as previous read data stored in the sub-scanning concentration change detector 421, and data of the (M+1)-th line as current data. The sub-scanning concentration change detector 421 calculates the amount of change in concentration from read data of the M-th line in the sub-scanning direction and read data of the (M+1)-th line in the sub-scanning direction.

In order to calculate the amount of change in concentration in the (M+1)-th line, the sub-scanning concentration change detector 421 first calculates an average value of the M-th line for R, RAVE[M], and an average value of the (M+1)-th line for R, RAVE[M+1]. The same expression is used to calculate average values for G, GAVE[M] and GAVE[M+1], and average values for B, BAVE[M] and BAVE[M+1].

$$RAVE[M]=(R[M][N]+R[M][N+1]+R[M][N+2]+R[M][N+3]+R[M][N+4]+R[M][N+5])/6 \quad \text{(Expression 25)}$$

$$RAVE[M+1]=(R[M+1][N]+R[M][N+1]+R[M][N+2]+R[M][N+3]+R[M][N+4]+R[M][N+5])/6 \quad \text{(Expression 26)}$$

The sub-scanning concentration change detector 421 calculates a difference value RDIFF[M] between the average value RAVE[M] and the average value RAVE[M+1] by an expression given below. The same expression is used to calculate a difference value GDIFF[M] for G and a difference value BDIFF[M] for B.

$$RDIFF[M]=|RAVE[M]-RAVE[M+1]| \quad \text{(Expression 27)}$$

The calculated difference values RDIFF[M], GDIFF[M], and BDIFF[M] each indicate the amount of change in concentration in the sub-scanning direction of the original 102. The sub-scanning concentration change detector 421 transmits the calculated difference values RDIFF[M], GDIFF[M], and BDIFF[M] to the sub-scanning color shift detector 417.

The sub-scanning color shift detector 417 performs pattern matching with the use of the difference value for R, the difference value for G, and the difference value for B that are obtained from the sub-scanning concentration change detector 421, to thereby determine the site of a sub-scanning color shift. The sub-scanning color shift detector 417 determines the site of a sub-scanning color shift by performing pattern matching for the M-th line with the use of, for example, the following conditional expression:
Third Conditional Expression:

$$(R[N]>R[N+1]+\alpha)\&(R[N+1]>R[N+2]+\alpha)\&$$
$$(R[N+2]+\alpha<R[N+3])\&(R[N+3]>R[N+4]+\alpha)\&(R[N+4]>R[N+5]+\alpha)$$ (Expression 28)

$$(G[N]+\beta<G[N+1])\&(G[N+1]>G[N+2]+\beta)\&$$
$$(G[N+2]>G[N+3]+\beta)\&(G[N+3]+\beta<G[N+4])\&(G[N+4]>G[N+5]+\beta)$$ (Expression 29)

$$(B[N]>B[N+1]+\gamma)\&(B[N+1]+\gamma<B[N+2])\&(B[N+2]>B[N+3]+\gamma)\&(B[N+3]>B[N+4]+\gamma)\&(B[N+4]+\gamma<B[N+5])$$ (Expression 30)

The symbol "&" in the expressions represents a logical operator "AND". The symbols "α", "β", and "γ" represent coefficients that are set based on noise generated by the components (the CMOS sensors 117, the AFE 410, and others) of the image reading apparatus 100. The expressions of the third conditional expression are also conditions for determining whether or not the occurrence of a sub-scanning color shift necessitates a correction of read data.

The sub-scanning color shift detector 417 determines that there is a sub-scanning color shift in an area from the N-th pixel to the (N+5)-th pixel when (Expression 28) to (Expression 30) are all satisfied simultaneously. As an exception condition, the sub-scanning color shift detector 417 does not determine that there is a sub-scanning color shift when one of the difference values RDIFF, GDIFF, and BDIFF is equal to or lower than a given value, even if (Expression 28) to (Expression 30) are all satisfied simultaneously. A determination expression of the exception condition and the reason for setting the exception condition are described later. The description given above is of determination that is executed when conditions are as illustrated in FIG. 5 and FIG. 9. Determination for the conditions of FIG. 6 and FIG. 8 can be executed in a similar manner.

The sub-scanning color shift detector 417 executes the pattern matching determination once for every three pixels by setting N, which indicates the position of a pixel in the main scanning direction, to 1, 4, 7 . . . and so on. This is because the color filters 300 of R, the color filters 300 of G, and the color filters 300 of B are formed on the CMOS sensors 117 by application in a staggered pattern of a three-pixel cycle, and the pattern emerges once in three pixels in principle. Execution of pattern matching only at points where the pattern emerges in principle may reduce the chance of erroneously detecting a sub-scanning color shift, even when there is an image that has a pattern similar to an image of the original 102.

Figure 14:
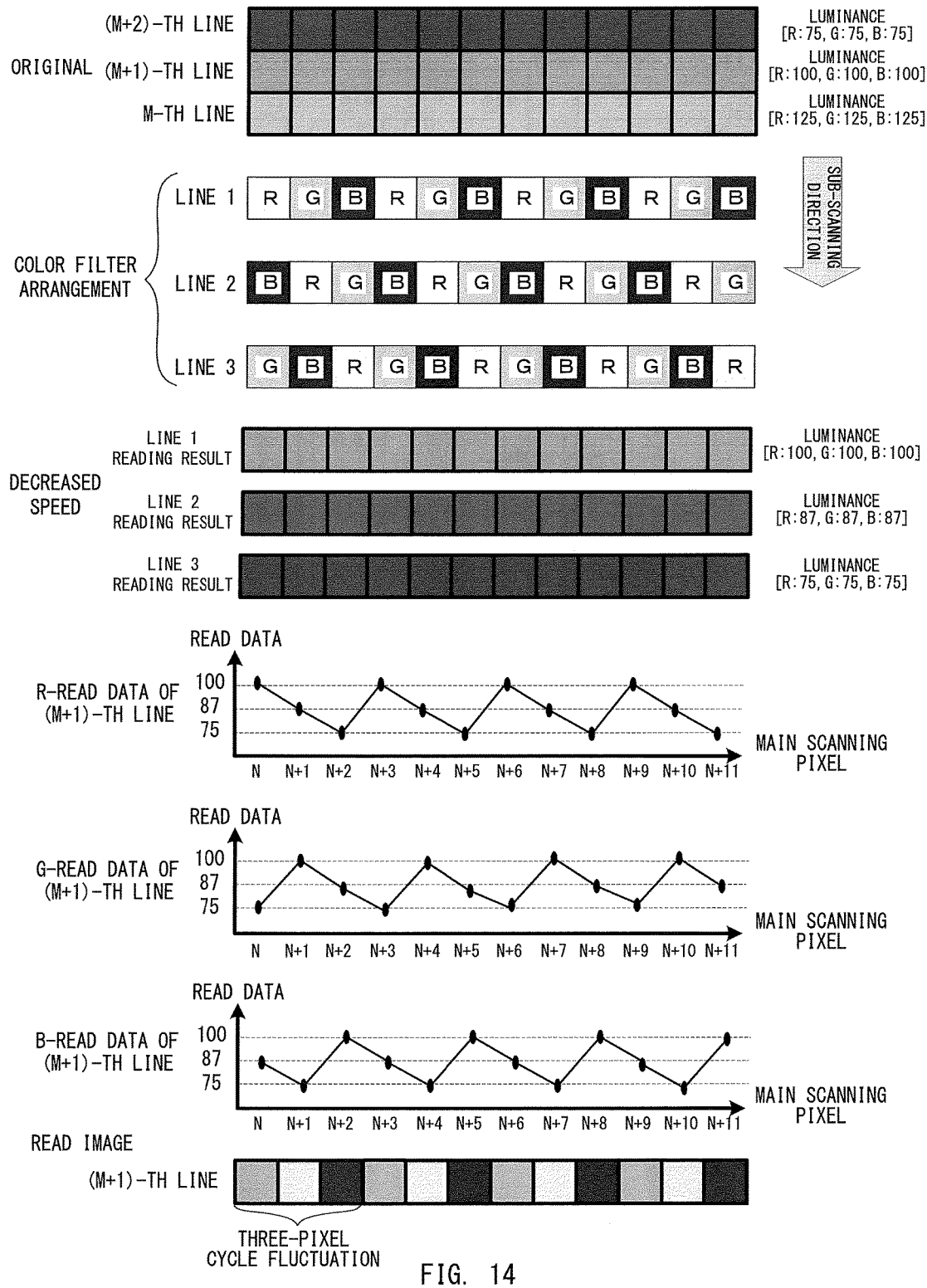
FIG. 14 is an explanatory diagram of still another read image.

The exception condition is described. FIG. 14 is an explanatory diagram of a read image in the case where a sub-scanning color shift similar to the one in FIG. 5 occurs. FIG. 14 differs from FIG. 5 in that the luminance of R, G, and B on the M-th line in the sub-scanning direction of the original 102 are each "125", which translates into a color gray. In the (M+1)-th line, which is behind the M-th line by one line, each luminance of R, G, and B is "100", and the color is gray slightly darker than the color of the M-th line. In the (M+2)-th line, which is behind the M-th line by two lines, each luminance of R, G, and B is "75", and the color is black that is slightly darker than the color of the (M+1)-th line. In other words, the luminance of the original 102 changes in the sub-scanning direction from "125" to "100" and then to "75". The image on the original 102 grows gradually darker as in FIG. 5, but by small degrees.

While luminance values that are not affected by any noise are written in FIG. 14, optical shot noise and other types of noise mix in with an analog electric signal output from the CMOS sensor 117 in actuality. In addition, an error and the like occur in read data that is output from the front-side reader 112 and read data that is output from the back-side reader 120 when the AFEs 410 and 411 execute sample-and-hold processing, offset processing, gain processing, and other types of analog processing, and when an analog electric signal is converted into digital data. The noises may therefore occur accidentally in the pattern illustrated in FIG. 14. A sub-scanning color shift that is not really there may be detected erroneously in this case.

Figure 15:
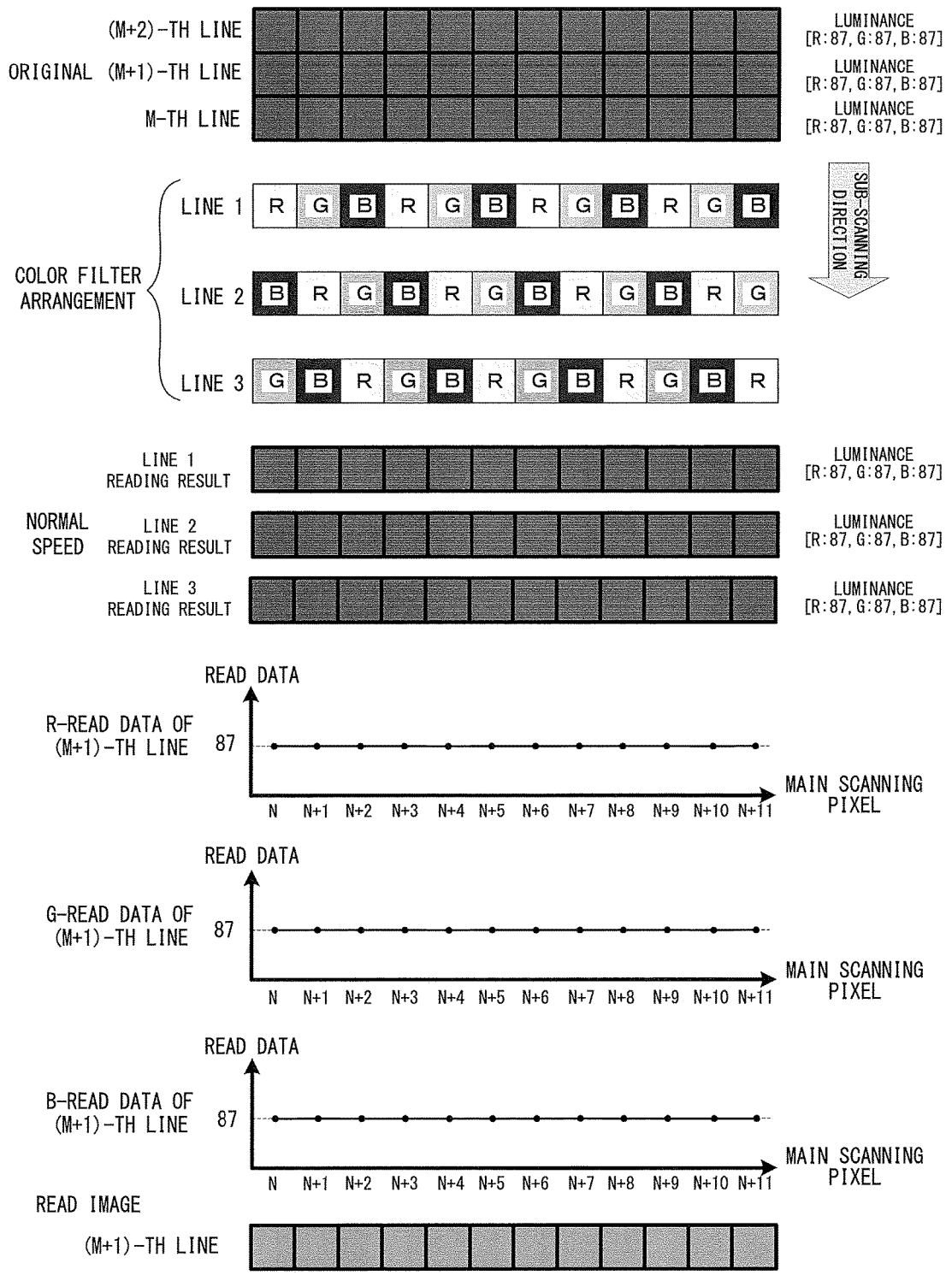
FIG. 15 is an explanatory diagram of erroneous detection of sub-scanning color shifts.
Figure 16:
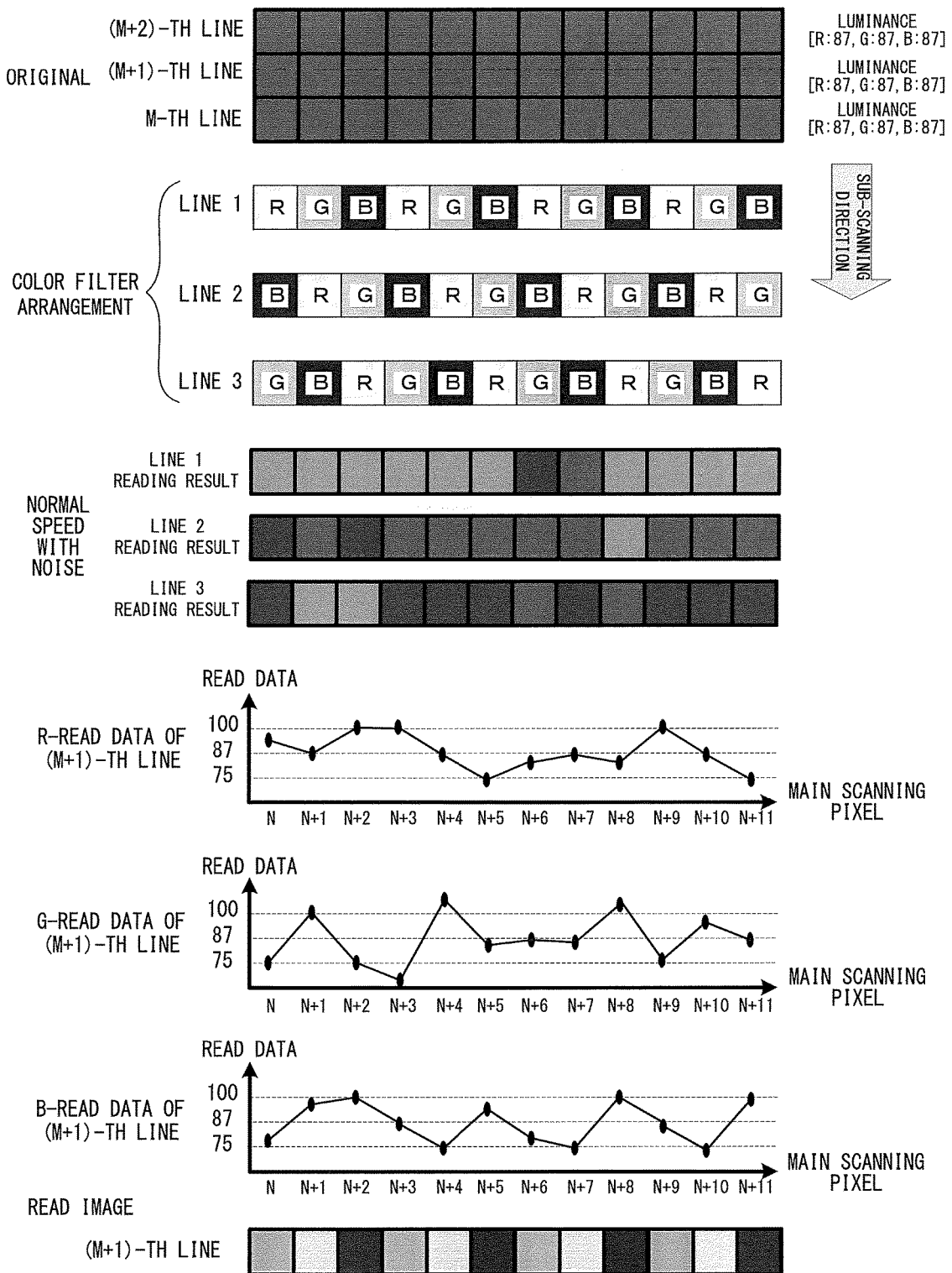
FIG. 16 is an explanatory diagram of erroneous detection of sub-scanning color shifts.
Figure 17:
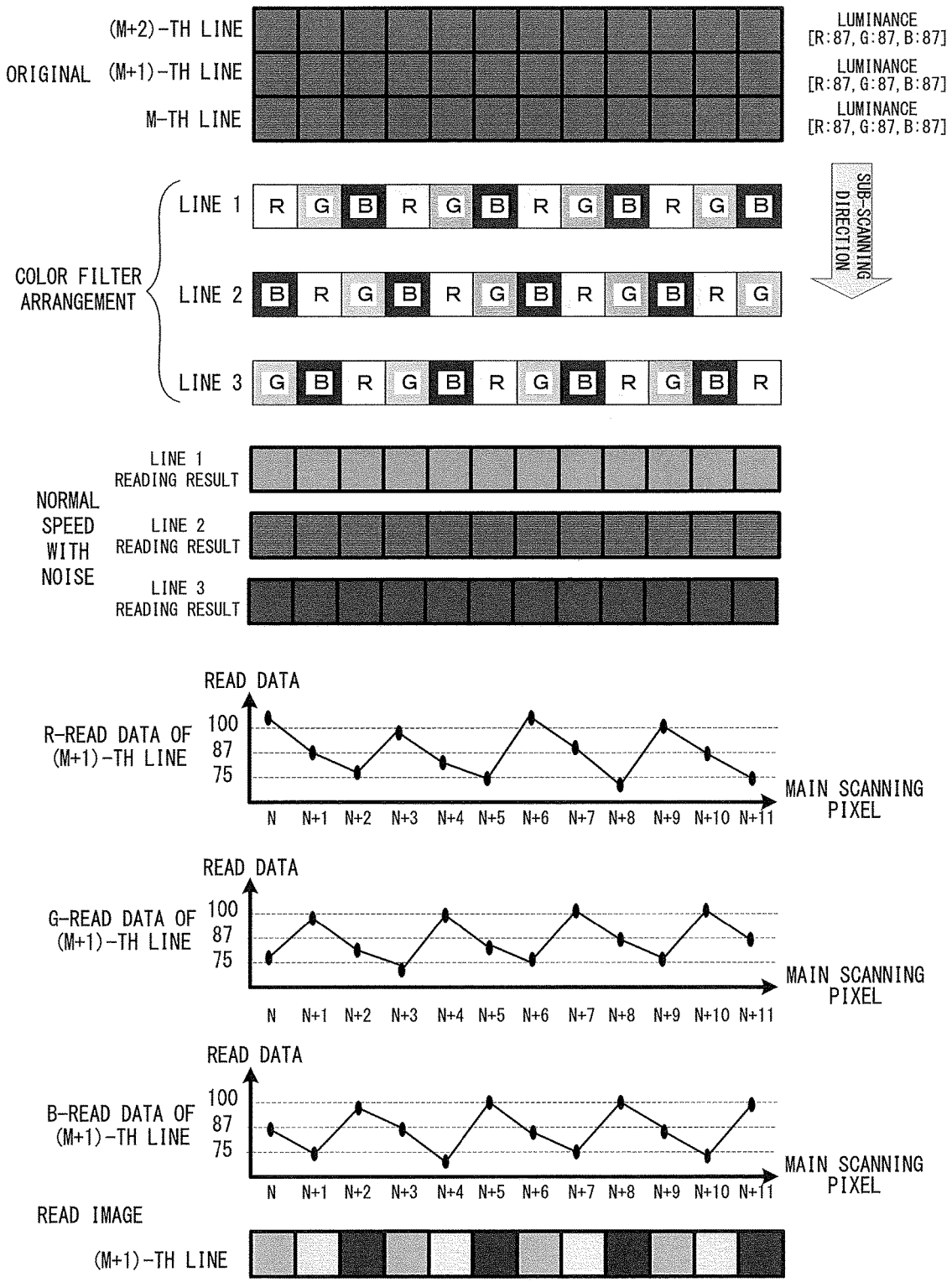
FIG. 17 is an explanatory diagram of erroneous detection of sub-scanning color shifts.

FIG. 15 to FIG. 17 are explanatory diagrams for illustrating how a sub-scanning color shift is detected erroneously due to noise. FIG. 15 to FIG. 17 are explanatory diagrams of a read image that is read from the original 102 with the use of the CMOS sensors 117 of FIG. 2A and FIG. 2B in which the color filters 300 are formed by application. The conveying speed of the original 102 does not change in FIG. 15 to FIG. 17.

The read image illustrated in FIG. 15 is obtained when there is none of the noises described above. The read image illustrated in FIG. 16 is obtained when the luminance fluctuates at random by approximately ±10 due to the noises described above. In the case illustrated in FIG. 16, reading results that do not satisfy (Expression 28), (Expression 29), and (Expression 30) of the conditional expression when α, β, and γ are each set to 0 happen to satisfy the conditional expression due to the random noise. Reading results of FIG. 17 satisfy (Expression 28), (Expression 29), and (Expression 30) of the conditional expression when α, β, and γ are each set to 0.

In the case of FIG. 17, the coefficient α in (Expression 28), the coefficient β in (Expression 29), and the coefficient γ in (Expression 30) are varied depending on the amount of noise generated. When α, β, and γ are each set to 10, for example, it can be determined that there is no sub-scanning color shift without performing pattern matching under the conditions of FIG. 17. Taking (Expression 28) as an example, luminance values read from the original 102 in FIG. 17 are (105>87+α)&(87>78+α)&(78+α<95)&(95>82+α)&(82>75+α). In this case, it may be determined that the conditions of the second term and the fifth term are not fulfilled.

The coefficients α, β, and γ are set by taking noise into account, and terms of (Expression 28) up through the second term are in the form of R[N]>R[N+1]+α. When the determination is executed by using R[N]>R[N+1] as it is (the coefficient α=0), there is a chance for erroneous detection if, for example, a random noise that makes R[N] a positive value mixes in with R[N] and a random noise that makes R[N+1] a negative value mixes in with R[N+1]. The coefficients α, β, and γ are therefore set by taking noise into account.

When the coefficients α, β, and γ are set to too large a value, the sub-scanning color shift detector 417 cannot detect a sub-scanning color shift illustrated in FIG. 14 and other cases where the luminance value of an image fluctuates in small magnitude in the sub-scanning direction. Conversely, when the coefficients α, β, and γ are set to too small a value, the sub-scanning color shift detector 417 cannot satisfactorily reduce the influence of noise illustrated in FIG. 17. Taking this into consideration, the sub-scanning color shift detector 417 does not determine that there is a sub-scanning color shift when one of the difference values RDIFF, GDIFF, and BDIFF is equal to or less than a given value, that is, when the amount of change in concentration is small in the sub-scanning direction of an image of the original 102.

In light of the points described above, the sub-scanning color shift detector 417 sets the coefficients α, β, and γ with the use of the following conditional expressions:

The coefficient α is determined from the difference value RDIFF as follows:

RDIFF<a first threshold . . . does not determine that there is a sub-scanning color shift
The first threshold≤RDIFF<a second threshold . . . α=10
The second threshold≤RDIFF<a third threshold . . . α=20
The coefficient β is determined from the difference value GDIFF as follows:
GDIFF<a first threshold . . . does not determine that there is a sub-scanning color shift
The first threshold≤GDIFF<a second threshold . . . β=10
The second threshold≤GDIFF<a third threshold . . . β=20
The coefficient γ is determined from the difference value BDIFF as follows:
BDIFF<a first threshold . . . does not determine that there is a sub-scanning color shift
The first threshold≤BDIFF<a second threshold . . . γ=15
The second threshold≤BDIFF<a third threshold . . . γ=25

The conditional expressions, the first threshold to the third threshold, and the coefficients α, β, and γ are stored in the non-volatile memory 402. The CPU 401 reads the conditional expressions, the first threshold to the third threshold, and the coefficients α, β, and γ out of the non-volatile memory 402 and sets the read expressions and values in the sub-scanning color shift detector 417 prior to the image reading processing.

The first threshold, the second threshold, and the third threshold are thresholds for determining the magnitudes of the difference values RDIFF, GDIFF, and BDIFF. The reason for performing this control is described. When the difference values RDIFF, GDIFF, and BDIFF are large, namely, when the amount of change in concentration in the sub-scanning direction of the original 102 (a sub-scanning concentration change amount) is large, the characteristic pattern emerges more readily than when the sub-scanning concentration change amount is small. Large values, which are safe in that the chance of erroneous detection due to noise or other factors is low, are accordingly selected for the coefficients α, β, and γ. When the difference values RDIFF, GDIFF, and BDIFF are small, on the other hand, namely, when the sub-scanning concentration change amount of the original 102 is small, the characteristic pattern emerges less readily than when the sub-scanning concentration change amount is large. Small values are accordingly selected for the coefficients α, β, and γ.

In the case where the difference values RDIFF, GDIFF, and BDIFF are smaller than a given value, the characteristic pattern does not emerge and there is a high chance of erroneous detection in which a pattern that is generated by noise or other factors and that happens to match the characteristic pattern is erroneously detected as the characteristic pattern. The sub-scanning color shift detector 417 is therefore kept from determining that there is a sub-scanning color shift. While the second embodiment uses the conditional expressions given above as an example, any method that controls the magnitudes of the coefficients α, β, and γ based on the magnitudes of the difference values can be employed, and the present invention is not limited to the conditional expressions described above which use the first threshold to the third threshold, the determination method described above, and the thresholds described above.

Image processing according to the second embodiment is the same as the processing described in the first embodiment with reference to FIG. 11, except that sub-scanning color shift detecting processing that includes the exception processing described above is executed. Processing that is executed when the image reading apparatus 100 of the second embodiment is activated is obtained by adding a step of setting the conditional expressions and the first threshold to the third threshold in the sub-scanning color shift detector 417 to the processing described in the first embodiment with reference to FIG. 12.

The thus configured image reading apparatus 100 according to the second embodiment is capable of detecting a sub-scanning color shift with an even higher precision and with a reduced chance for erroneous detection, in addition to having the effects of the first embodiment.

Third Embodiment

In the first embodiment and the second embodiment, a sub-scanning color shift is corrected by using the luminance value of a given pixel in read data as a reference and matching the luminance values of other pixels to the reference luminance value. An image reading apparatus according to a third embodiment of the present invention uses an average luminance value for every three pixels to correct a sub-scanning color shift. The image reading apparatus 100 of the third embodiment has the same configuration as the one in the first embodiment, and a description on the configuration is omitted.

The description given here takes as an example a case where it is determined that there is a sub-scanning color shift as the one illustrated in FIG. 6 among pixels from the N-th pixel to the (N+5)-th pixel in the main scanning direction. Whether there is a sub-scanning color shift is determined by the same method that is used in the first embodiment and the second embodiment, and a description on the method is omitted.

Figure 18:
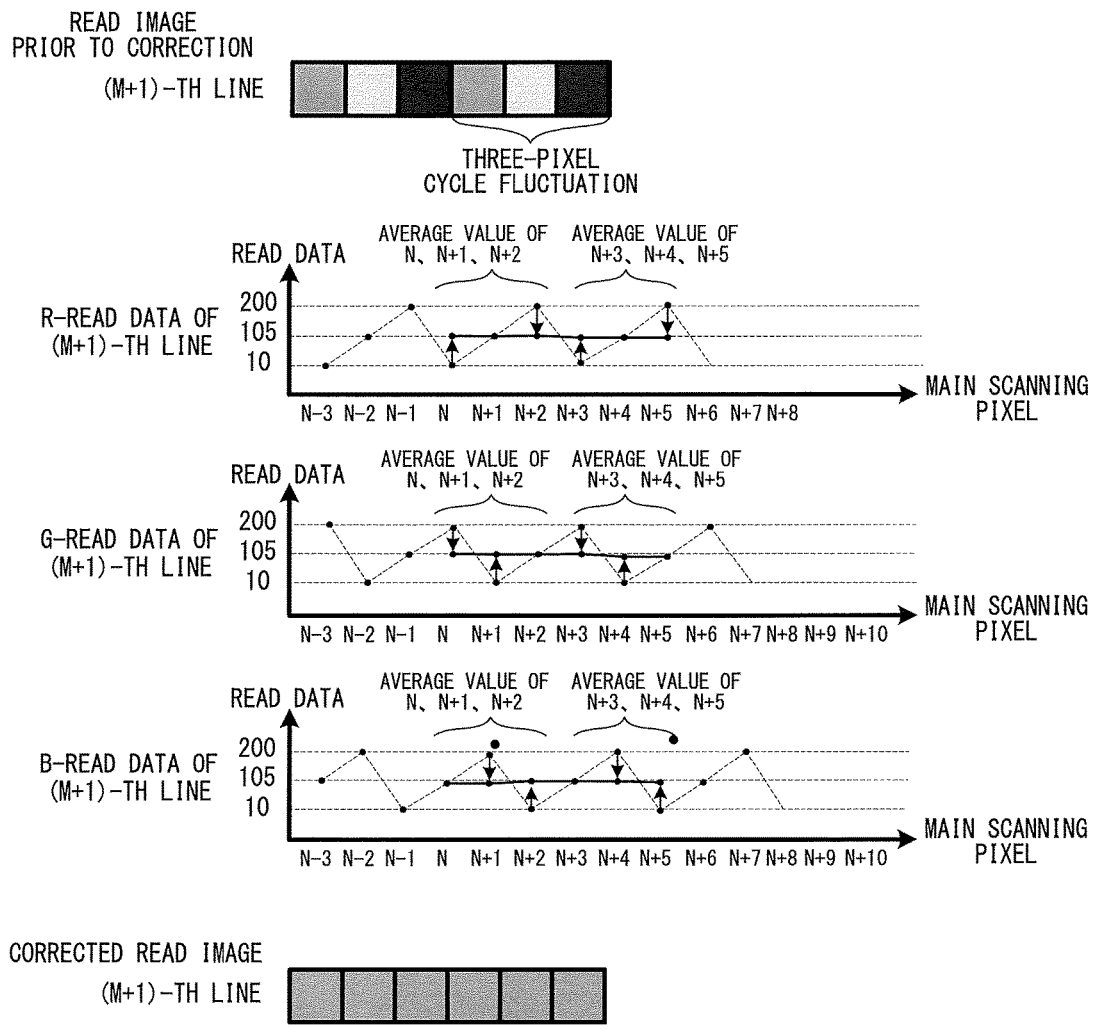
FIG. 18 is an explanatory diagram of sub-scanning color shift correction.
Figure 19:
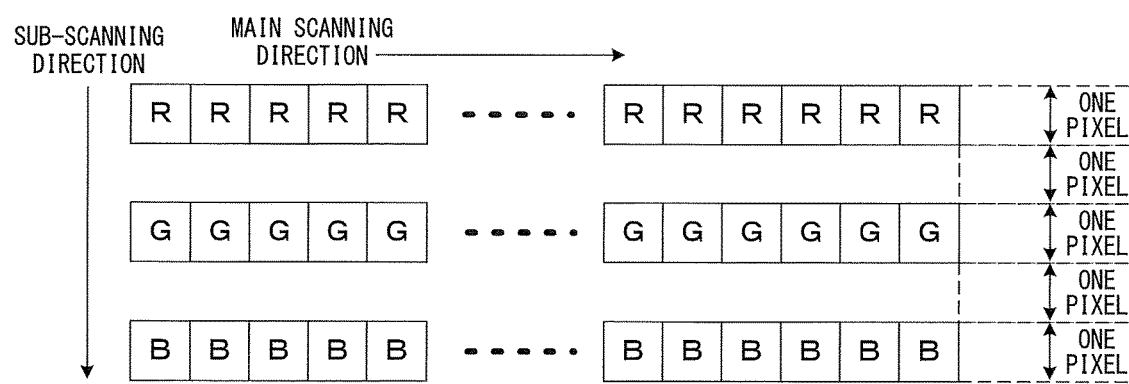
FIG. 19 is a schematic diagram of the alignment of CMOS sensors in the related art.

FIG. 18 is an explanatory diagram of sub-scanning color shift correction executed by the color shift corrector 418. When there is a sub-scanning color shift among pixels from the N-th pixel to the (N+5)-th pixel in the main scanning direction, the color shift corrector 418 corrects the sub-scanning color shift by converting the values of R-read data, G-read data, and B-read data with the use of the following expressions:

$R[N]=(R[N]+R[N+1]+R[N+2])/3$ (Expression 31)

$R[N+1]=(R[N]+R[N+1]+R[N+2])/3$ (Expression 32)

$R[N+2]=(R[N]+R[N+1]+R[N+2])/3$ (Expression 33)

$R[N+3]=(R[N+3]+R[N+4]+R[N+5])/3$ (Expression 34)

$R[N+4]=(R[N+3]+R[N+4]+R[N+5])/3$ (Expression 35)

$R[N+5]=(R[N+3]+R[N+4]+R[N+5])/3$ (Expression 36)

$G[N]=(G[N]+G[N+1]+G[N+2])/3$ (Expression 37)

$G[N+1]=(G[N]+G[N+1]+G[N+2])/3$ (Expression 38)

$G[N+2]=(G[N]+G[N+1]+G[N+2])/3$ (Expression 39)

$G[N+3]=(G[N+3]+G[N+4]+G[N+5])/3$ (Expression 40)

$G[N+4]=(G[N+3]+G[N+4]+G[N+5])/3$ (Expression 41)

$G[N+5]=(G[N+3]+G[N+4]+G[N+5])/3$ (Expression 42)

$B[N]=(B[N]+B[N+1]+B[N+2])/3$ (Expression 43)

$$B[N+1]=(B[N]+B[N+1]+B[N+2])/3 \quad \text{(Expression 44)}$$

$$B[N+2]=(B[N]+B[N+1]+B[N+2])/3 \quad \text{(Expression 45)}$$

$$B[N+3]=(B[N+3]+B[N+4]+B[N+5])/3 \quad \text{(Expression 46)}$$

$$B[N+4]=(B[N+3]+B[N+4]+B[N+5])/3 \quad \text{(Expression 47)}$$

$$B[N+5]=(B[N+3]+B[N+4]+B[N+5])/3 \quad \text{(Expression 48)}$$

(Expression 31) to (Expression 48) make the values of the N-th pixel to the (N+5)-th pixel substantially equal to one another in R-read data, G-read data, and B-read data. A site that has unintendedly been tinted due to the sub-scanning color shift is consequently converted into an achromatic site.

It is difficult to predict the amount and direction of a sub-scanning color shift that is caused by the flapping of the original 102. When read data of a pixel is corrected so as to match read data of a pixel that is the brightest of all pixels near the pixel of interest, or of a pixel that is the darkest of all pixels near the pixel of interest, as in the first embodiment and the second embodiment, the corrected read data can have a luminance close to the luminance of the original 102 in some cases, depending on the amount and direction of the sub-scanning color shift, and the opposite is true in other cases. In the third embodiment, on the other hand, an average value of read data of adjacent three pixels is used for correction, and corrected read data can therefore have a luminance close to the luminance of the original 102 to some degree even when the amount and direction of the sub-scanning color shift fluctuate. The image reading apparatus 100 according to the third embodiment is thus capable of correcting a sub-scanning color shift with an even higher precision despite fluctuations in the amount and direction of the sub-scanning color shift, in addition to having the effects of the first embodiment and the second embodiment.

While the descriptions on the image reading apparatus 100 according to the first embodiment to the third embodiment take as an example the CMOS sensors 117 in which color filters of R, G, and B are formed by application in the order stated in the main scanning direction. Obviously, the same control can be performed also when R, G, and B are in a different order. According to the present invention, sub-scanning color shifts caused by various causes can thus be corrected by correcting read data when the read data fulfills a condition for determining whether or not the read data needs to be corrected.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-097857, filed May 16, 2016 which is hereby incorporated by reference herein in its entirety.

What is claimed is:

1. An image reading apparatus comprising:
a conveyor configured to convey a document;
a reading unit including a sensor configured to receive light reflected from the document conveyed by the conveyor, and configured to read an image of the document conveyed by the conveyor using the sensor, the sensor comprising:
    a first line sensor having a plurality of light receiving elements including a light receiving element receiving light of a first color and a light receiving element receiving light of a second color that is different from the first color, the plurality of light receiving elements being arranged in a first direction in the first line sensor,
    a second line sensor having a plurality of light receiving elements including a light receiving element receiving light of the first color and a light receiving element receiving light of the second color, the plurality of light receiving elements being arranged in the first direction in the second line sensor, and
    the first line sensor and the second line sensor being arranged at a predetermined interval in a second direction, the second direction being a direction in which the document is conveyed by the conveyor;
a generator configured to generate read data representing an image of the document based on a result of receiving the light of the sensor;
at least one processor; and
a memory storing instructions which cause the at least one processor:
    to detect a color shift in the second direction based on the read data generated by the generator, wherein the color shift in the second direction occurs in an area of a rear edge of the document in the second direction and the color shift in the second direction is caused by reading, by the reading unit, the image of the document being conveyed by the conveyor; and
    to correct the read data corresponding to the rear edge of the document in the second direction based on a result of the detection.

2. The image reading apparatus according to claim 1, wherein a periodic characteristic of a luminance of the first color in the first direction occurs due to the color shift in the second direction.

3. The image reading apparatus according to claim 2, further comprising:

a storage unit configured to store an information corresponding to the periodic characteristic of the luminance of the first color in the first direction, wherein the read data includes a luminance value indicating the luminance that is obtained from a result of receiving light with the light receiving element, and wherein the processor is configured to detect the color shift in the second direction based on whether or not a luminance value of the read data of the first color in the first direction matches the periodic characteristic.

4. The image reading apparatus according to claim 3, wherein the processor is configured to correct a luminance value corresponding to a target light receiving element based on a luminance value corresponding to a light receiving element adjacent to the target light receiving element in the first direction.

5. The image reading apparatus according to claim 4, wherein the processor is configured to correct the luminance value corresponding to the target light receiving element so that the luminance value corresponding to the target light receiving element is the same as a luminance value corresponding to the light receiving element adjacent to the target light receiving element in the first direction.

6. The image reading apparatus according to claim 4, wherein the processor is configured to correct the luminance value corresponding to the target light receiving element by using an average luminance value corresponding to light receiving elements adjacent to the target light receiving elements in the first direction.

7. The image reading apparatus according to claim 1, wherein each of the first line sensor and the second line sensor includes a light receiving element receiving light of the first color and a light receiving element receiving light of the second color disposed adjacent to the light receiving element receiving light of the first color.

8. The image reading apparatus according to claim 1, wherein a light-receiving element disposed on a first position in the first direction with respect to the first line sensor is a light receiving element receiving light of the first color, and wherein a light-receiving element disposed on the first position with respect to the second line sensor is a light-receiving element receiving light of the second color.

9. The image reading apparatus according to claim 1, wherein each of the first line sensor and the second line sensor further includes a light receiving element receiving light of a third color that is different from both the first color and the second color.

10. The image reading apparatus according to claim 9, wherein in the first line sensor and in the second line sensor, a light receiving element receiving light of the first color, a light receiving element receiving light of the second color, and a light receiving element receiving light of the third color are periodically arranged in the first direction.

11. The image reading apparatus according to claim 9, wherein the first color is red color, the second color is green color and the third color is blue color.

12. The image reading apparatus according to claim 9, wherein each of the first line sensor and the second line sensor includes a light receiving element receiving light of the first color, a light receiving element receiving light of the second color adjacent to the light receiving element receiving light of the first color and a light receiving element receiving light of the third color adjacent to the light receiving element receiving light of the second color.

13. The image reading apparatus according to claim 9, wherein the sensor comprises a third line sensor having a plurality of light receiving elements including a light receiving element receiving light of the first color, a light receiving element receiving light of the second color, and a light receiving element receiving light of the third color, the plurality of light receiving elements being arranged in the first direction in the third line sensor, and wherein the first line sensor, the second line sensor and the third line sensor are arranged at the predetermined interval in the second direction.

14. The image reading apparatus according to claim 13, wherein a light receiving element disposed on a first position in the first direction in the first line sensor is a light receiving element receiving light of the first color, wherein a light receiving element disposed on the first position in the first direction in the second line sensor is a light receiving element receiving light of the second color, and wherein a light receiving element disposed on the first position in the first direction in the third line sensor is a light receiving element receiving light of the third color.

15. The image reading apparatus according to claim 13, wherein in the first line sensor, in the second line sensor and in the third line sensor, a light receiving element receiving light of the first color, a light receiving element receiving light of the second color, and a light receiving element receiving light of the third color are periodically arranged in the first direction.

16. The image reading apparatus according to claim 13, wherein the first color is red color, the second color is green color and the third color is blue color.

17. The image reading apparatus according to claim 1, wherein the processor is configured to detect the color shift in the second direction by comparing read data corresponding to a first light receiving element receiving light of the first color included in the first line sensor with read data corresponding to a second light receiving element receiving light of the first color included in the second line sensor, and wherein, a position where the second light receiving element is disposed in the first direction is a position where a light receiving element adjacent to the first light receiving element is disposed.

18. The image reading apparatus according to claim 1, wherein the sensor is a CMOS sensor.

19. The image reading apparatus according to claim 1, wherein a distance between a center of a first light receiving element disposed on a first position with respect to the first line sensor and a center of a second light receiving element adjacent to the first light receiving element in the first direction with respect to the first line sensor, is less than a distance between a center of the first light receiving element and a center of a third light receiving element disposed on the first position with respect to the second line sensor in the second direction.

20. The image reading apparatus according to claim 1, wherein the predetermined interval corresponds to one pixel.

21. An image forming apparatus, comprising:
a conveyor configured to convey a document;
an image reading apparatus including a sensor configured to receive light reflected from the document conveyed by the conveyor and configured to read an image of the document conveyed by the conveyor using the sensor; and a generator configured to generate read data representing an image of the document based on a result of receiving the light of the sensor;

an image forming unit configured to form an image on a recording medium based on the read data generated by the generator, wherein the sensor comprises:
- a first line sensor having a plurality of light receiving elements including a light receiving element receiving light of a first color and a light receiving element receiving light of a second color that is different from the first color, the plurality of light receiving elements being arranged in a first direction in the first line sensor,
- a second line sensor row having a plurality of light receiving elements including a light receiving element receiving light of the first color and a light receiving element receiving light of the second color, the plurality of light receiving elements being arranged in the first direction in the second line sensor, and
- the first line sensor and the second line sensor being arranged at a predetermined interval in a second direction, the second direction being a direction in which the document is conveyed by the conveyor;

at least one processor; and a memory storing instructions which cause the at least one processor:

to detect a color shift in the second direction based on the read data generated by the generator, wherein the color shift in the second direction occurs in an area of a rear edge of the document in the second direction and the color shift in the second direction is cause by reading, by the reading unit, the image of the document being conveyed by the conveyor; and to correct the read data corresponding to the rear edge of the document in the second direction based on a result of the detection.

* * * * *